US008271842B2

(12) United States Patent
Nagaraja

(10) Patent No.: US 8,271,842 B2
(45) Date of Patent: Sep. 18, 2012

(54) REDUCING HARQ RETRANSMISSIONS USING PEAK POWER MANAGEMENT TECHNIQUES

(75) Inventor: Nagendra Nagaraja, Bangalore Karnatak (IN)

(73) Assignee: QUALCOMM Incorporated, San Diego, CA (US)

( * ) Notice: Subject to any disclaimer, the term of this patent is extended or adjusted under 35 U.S.C. 154(b) by 1132 days.

(21) Appl. No.: 12/139,319

(22) Filed: Jun. 13, 2008

(65) Prior Publication Data

US 2009/0313519 A1  Dec. 17, 2009

(51) Int. Cl.
*H04L 1/18* (2006.01)
*H04L 1/00* (2006.01)
*H03M 13/00* (2006.01)
*H04B 17/00* (2006.01)

(52) U.S. Cl. ........ 714/748; 714/749; 714/751; 714/752; 714/776; 370/216; 370/241; 370/242; 375/224; 375/225; 375/226; 375/227; 375/228

(58) Field of Classification Search .................. 714/748, 714/749, 751, 752, 776; 370/216, 241, 242; 375/224, 225, 226, 227, 228
See application file for complete search history.

(56) References Cited

U.S. PATENT DOCUMENTS

| | | | | |
|---|---|---|---|---|
| 7,225,389 | B2 * | 5/2007 | Tsuchie | 714/774 |
| 7,428,426 | B2 * | 9/2008 | Kiran et al. | 455/522 |
| 2006/0120474 | A1 | 6/2006 | Hong et al. | |
| 2006/0209932 | A1 * | 9/2006 | Khandekar et al. | 375/148 |
| 2007/0147486 | A1 * | 6/2007 | Labs et al. | 375/222 |
| 2008/0130534 | A1 | 6/2008 | Tomioka | |
| 2008/0285432 | A1 * | 11/2008 | Ueng et al. | 370/203 |
| 2011/0188465 | A1 * | 8/2011 | Han et al. | 370/329 |

FOREIGN PATENT DOCUMENTS

| | | |
|---|---|---|
| WO | WO97037507 | 10/1997 |
| WO | WO99012303 | 3/1999 |

OTHER PUBLICATIONS

Zhang et al., Hybrid ARQ with Selective Combining for Fading Channels, May 1999, IEEE, vol. 17, No. 5, pp. 867-880.*
Tarokh et al. On the Computation and Reduction of the Peak-to-Average Power Ratio in Multicarrier Communications, Jan. 2000, IEEE, vol. 48, No. 1, pp. 37-44.*

(Continued)

*Primary Examiner* — John J Tabone, Jr.
(74) *Attorney, Agent, or Firm* — Eric Ho

(57) ABSTRACT

Systems, methods and apparatuses for reducing HARQ retransmissions using peak power management techniques are presented. In one example, a receiver may perform multi-level error correction for reducing HARQ retransmissions. The receiver may include a Peak-to-Average-Power Ratio Management Module (PAPR MM) decoder configured to perform a first level of error correction utilizing retransmissions originating at a front end of a distal transmitter. The receiver may further include a symbol demapping module connected to the PAPR MM decoder, a deinterleaver connected to the symbol demapping module, and a decoder connected to the deinterleaver and the PAPR MM decoder, where the decoder may be configured to perform a second level of error correction utilizing retransmissions originating at a back end of the distal transmitter. A transmitter for reducing HARQ retransmissions using PAPR techniques is also presented.

75 Claims, 12 Drawing Sheets

OTHER PUBLICATIONS

Richard D. J. van Nee, OFDM Codes for Peak-to-Average Power Reduction and Error Correction, 1996, IEEE, pp. 740-744.*
International Search Report/Written Opinion—PCT/US08/080445—International Search Authority EPO—Jul. 2, 2009.

Ji, et al: "Turbo-coded ARQ schemes for DS-CDMA data networks over fading and shadowing channels," Military Communications Conference Proceedings, 1999. IEEE Oct. 31-Nov. 3, 1999, vol. 1, Oct. 31, 1999, pp. 76-80. ISBN: 978-0-7803-5538-5, Section I-III.

* cited by examiner

REDUCING HARQ RETRANSMISSIONS USING PEAK POWER MANAGEMENT TECHNIQUES

FIELD OF DISCLOSURE

The embodiments of the disclosure relate generally to improving the efficiency of error correction for digital communications, and more specifically, for reducing Hybrid Automatic Repeat Request (HARQ) retransmissions based upon peak-to-average power ratio management techniques.

BACKGROUND

The demand for improving the capacity, speed and quality of wireless data services is driving advancements in the spectral efficiency and error correction capability of wireless communication systems.

Improvements in spectral efficiency may be realized using multi-carrier modulation techniques which can use a number of closely spaced, non-interfering orthogonal sub-carriers that overlap in frequency. Such modulation techniques include Orthogonal Frequency Division Multiplexing (OFDM) and Orthogonal Frequency Division Multiple Access (OFDMA), which have been successfully used because of their efficiency and high tolerance to adverse multipath effects. However, these modulation techniques may produce transmit signals having a peak power level which is much larger than the average power of the transmitted signal, thus having a high Peak-to-Average-Power Ratio (PAPR). Signals having large peaks may increase the amount of intermodulation distortion resulting in an increase in the error rate. Minimizing the PAPR allows a higher average power to be transmitted for a fixed peak power, which may improve the overall signal-to-noise ratio at the receiver.

The PAPR of a multi-carrier modulated signal may be managed using a variety of approaches which introduce some redundancy into the communication system. One known PAPR management technique is called Selective Mapping (SM), which may involve generating a large set of data vectors all representing the same information. The data vector with the lowest resulting PAPR may be selected for transmission. Another PAPR management approach is called Partial Transmit Sequences (PTS), which rotates the phase of data vectors creating a set of candidate signals conveying similar information. The rotated phase signal providing the lowest PAPR is chosen for transmission.

As mentioned above, the increasing demand for improved wireless communication systems are also driving improvements in error correction techniques. Transmission errors may be attributable to competing signals being simultaneously transmitted (especially in the case where signals have an undesirably high PAPR), inclement weather, signal strength shadows, electrical interference and/or other conditions affecting the air interface. Such conditions may result in one or more packets being dropped or corrupted. When a dropped or corrupted packet occurs, additional resources may be utilized to provide redundant information to correct the transmission error. One method of providing additional information is to selectively increase redundancy using HARQ processing. HARQ processing can enable error recovery by combining retransmitted packets with previously received corrupted packets stored at the receiver.

While HARQ processing may be effective at correcting errors, it can introduce undesirable latencies into a communication system. HARQ retransmissions conventionally involve redundant encoding operations, which may be computationally intensive and thus consume time and power.

Accordingly, it would be desirable to improve the efficiency of error correction for digital communications by reducing HARQ retransmissions during error correction operations.

SUMMARY

Exemplary embodiments of the disclosure are directed to systems, methods and apparatuses for reducing HARQ retransmissions using peak power management techniques.

One embodiment may include a method for correcting errors received over a communication link. The method may include receiving a packet at a decoder, where the packet may be a first retransmission of an initial transmission; determining if the packet contains an error which is uncorrectable using the initial transmission and/or the retransmission; performing a first level error correction based upon a subsequent retransmission of the packet originating from a Peak-to-Average Power Ratio (PAPR) management module encoder; determining if the corrupted packet can be corrected by the first error correction; and performing a second level error correction based upon a subsequent retransmission originating from an encoder, if the first error correction cannot correct the corrupted packet.

Another embodiment may include a method of correcting errors transmitted over a communications link. The method may include transmitting a packet to a receiver; buffering a transmitted symbol corresponding to the packet in a Peak-to-Average-Power Ratio Management Module (PAPR MM) encoder; receiving a notification regarding the status of the packet from the receiver; and selecting between a first encoding and a second encoding based upon a received notification, where the first encoding corresponds to a first level of error correction associated with the PAPR MM encoder, and the second encoding corresponds to a second level of error correction associated with a channel encoder.

Yet another embodiment may include a method for performing multi-level error correction which reduces HARQ retransmissions. The method may include receiving, at a first receiver, a packet retransmission from a second transmitter; determining, at the first receiver, if the packet contains an error which is uncorrectable using the retransmission and/or an initial transmission; transmitting, from a first transmitter, a negative acknowledgement (NACK) to a second receiver; and selecting, at the second transmitter, between a first encoding and a second encoding based upon the NACK, where the first encoding corresponds to a first level of error correction associated with a NACK Type 1, and the second encoding corresponds to a second level of error correction associated with a NACK Type 2.

Another embodiment may include a receiver which performs multi-level error correction for reducing HARQ retransmissions. The receiver may include a Peak-to-Average-Power Ratio Management Module (PAPR MM) decoder configured to perform a first level of error correction utilizing retransmissions originating at a front end of a distal transmitter; a symbol demapping module connected to the PAPR MM decoder; a deinterleaver connected to the symbol demapping module; and a decoder connected to the deinterleaver and the PAPR MM decoder, where the decoder may be configured to perform a second level of error correction utilizing retransmissions originating at a back end of the distal transmitter.

Another embodiment may include a transmitter which may perform multi-level error correction for reducing HARQ retransmissions. The transmitter may include a Peak-to-Average-Power Ratio Management Module (PAPR MM) encoder which may provide front end retransmissions to accommodate a first level of error correction; and at least one channel, connected to the PAPR MM encoder, for modulating data for transmission, wherein the at least one channel may further include a channel encoder, where the channel encoder may be configured to provide back end retransmission to accommodate a second level of error correction, an interleaver which may be connected to the channel encoder, and a symbol mapping module which may be connected to the interleaver.

Yet another embodiment may include a method for coordinating a multi-level error correction for reducing HARQ retransmissions. The method may include providing, from a back end of a receiver, a NACK Type 2 notification to a back end of a local transmitter in response to receiving an initial packet having an uncorrectable error; receiving, at the back end of a receiver, a first retransmitted packet having a new channel encoding in response to the NACK Type 2 notification; providing, from the front end of the receiver, a NACK Type 1 notification to a front end of a local transmitter in response to the first retransmitted packet having an uncorrectable error; and receiving, at the front end of the receiver, a subsequently retransmitted packet having a new PAPR encoding originating from the front end of the distal transmitter.

Another embodiment may include a method for coordinating a multi-level error correction for reducing HARQ retransmissions. The method may include providing, from a back end of a transmitter, an initial packet transmission having an uncorrectable error; receiving, from a back end of a local receiver, a retransmission request directed to the back end of the transmitter; retransmitting, from the back end of the transmitter, a subsequent packet having a new channel encoding; receiving, from a front end of the local receiver, a retransmission request directed to the front end of the transmitter; and retransmitting, from a front end of the transmitter, a subsequent packet having a new PAPR encoding.

Yet another embodiment may include an apparatus for correcting errors received over a communication link. The apparatus may include a means for receiving a packet at a decoder, wherein the packet is a first retransmission of an initial transmission; means for determining if the packet contains an error which is uncorrectable using the initial transmission and/or the retransmission; means for performing a first level error correction based upon a subsequent retransmission of the packet originating from a Peak-to-Average Power Ratio (PAPR) management module encoder; means for determining if the corrupted packet can be corrected by the first error correction; and means for performing a second level error correction based upon a subsequent retransmission originating from an encoder, if the first error correction cannot correct the corrupted packet.

Another embodiment may include an apparatus of correcting errors transmitted over a communications link. The apparatus may include a means for transmitting a packet to a receiver; means for buffering a transmitted symbol corresponding to the packet in a Peak-to-Average-Power Ratio Management Module (PAPR MM) encoder; means for receiving a notification regarding the status of the packet from the receiver; and means for selecting between a first encoding and a second encoding based upon a received notification, where the first encoding may correspond to a first level of error correction associated with the PAPR MM encoder, and the second encoding may correspond to a second level of error correction associated with a channel encoder.

Yet another embodiment may include an apparatus for performing multi-level error correction which reduces HARQ retransmissions. The apparatus may include means for receiving, at a first receiver, a packet retransmission from a second transmitter; means for determining, at the first receiver, if the packet contains an error which is uncorrectable using the retransmission and/or an initial transmission; means for transmitting, from a first transmitter, a negative acknowledgement (NACK) to a second receiver; and means for selecting, at the second transmitter, between a first encoding and a second encoding based upon the NACK, where the first encoding may correspond to a first level of error correction associated with a NACK Type 1, and the second encoding may correspond to a second level of error correction associated with a NACK Type 2.

Another embodiment may include an apparatus for coordinating a multi-level error correction for reducing HARQ retransmissions. The apparatus may include means for providing, from a back end of a receiver, a NACK Type 2 notification to a back end of a local transmitter in response to receiving an initial packet having an uncorrectable error; means for receiving, at the back end of a receiver, a first retransmitted packet having a new channel encoding in response to the NACK Type 2 notification; means for providing, from the front end of the receiver, a NACK Type 1 notification to a front end of a local transmitter in response to the first retransmitted packet having an uncorrectable error; and means for receiving, at the front end of the receiver, a subsequently retransmitted packet having a new PAPR encoding originating from the front end of the distal transmitter.

Another embodiment may include an apparatus for coordinating a multi-level error correction for reducing HARQ retransmissions. The apparatus may include means for providing, from a back end of a transmitter, an initial packet transmission having an uncorrectable error; means for receiving, from a back end of a local receiver, a retransmission request directed to the back end of the transmitter; means for retransmitting, from the back end of the transmitter, a subsequent packet having a new channel encoding; means for receiving, from a front end of the local receiver, a retransmission request directed to the front end of the transmitter; and means for retransmitting, from a front end of the transmitter, a subsequent packet having a new PAPR encoding.

Another embodiment may include a computer readable media embodying logic for correcting errors received over a communication link, the logic configured to perform a method which includes receiving a packet at a decoder, wherein the packet is a first retransmission of an initial transmission; determining if the packet contains an error which is uncorrectable using the initial transmission and/or the retransmission; performing a first level error correction based upon a subsequent retransmission of the packet originating from a Peak-to-Average Power Ratio (PAPR) management module encoder; determining if the corrupted packet can be corrected by the first error correction; and performing a second level error correction based upon a subsequent retransmission originating from an encoder, if the first error correction cannot correct the corrupted packet.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Figure 1:
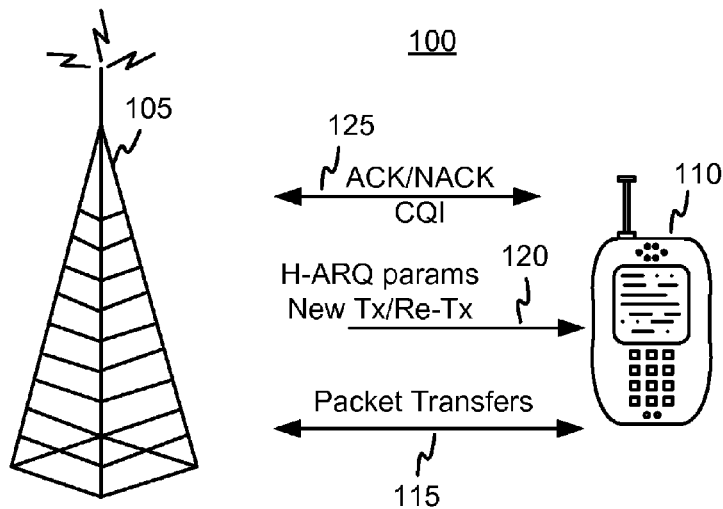
FIG. 1 shows a diagram depicting top-level signal interactions within an exemplary communications system network.

FIG. 1 depicts top-level interactions among components in an exemplary communications system network 100 consistent with an embodiment of the description. Network 100 may include a base station transceiver 105 and a mobile device 110. Various other elements may exist within the network 100 but are not shown for simplicity. Base station 105 may be in communications with mobile device 110 across various air interfaces or channels. A downlink shared channel 115 may be used as the primary radio bearer which can transfer traffic data packets between base station 105 and the mobile device 110. Supporting the operation of the downlink shared channel 115 may include additional control channels 120 and 125. A shared control channel 120 may provide signaling information to the mobile device 110 which may include HARQ related parameters and information regarding whether a packet is a new transmission or a retransmission. A physical control channel 125 may provide feedback information to the base station 105 which may include a Channel Quality Indicator (CQI). The physical channel 125 may also provide Acknowledgment (ACK)/Negative Acknowledgement (NACK) feedback generated by the mobile device 110 (which may be based upon, for example, a Cyclic Redundancy Check (CRC) within the mobile device 110).

Base station 105 may transmit data messages or other information wirelessly to mobile device 110 by conventional over the air techniques. For example, the wireless signals between mobile device 110 and the base station 105 may be based on any of several different technologies, including but not limited to, CDMA (code division multiple access), MC-CDMA (multi-carrier code division access), TDMA (time division multiple access), FDMA (frequency division multiplexed access), OFDM (orthogonal frequency division multiplexing) and any systems using a hybrid of coding technologies such as GSM, or other like wireless protocols used in communications or data networks.

HARQ processing can enable reliable recovery from errors by storing corrupted packets in the mobile device 110 rather than discarding them. When a corrupted packet is received, the mobile device 110 may store it in an on-board buffer, and combine the corrupted packet with one or more subsequent retransmissions to increase the probability of a successful decoding. Even if the retransmitted packet(s) contains errors, a good packet can be derived from the combination previously received corrupted transmissions. This process may be referred to as soft combining, and can include Chase Combining (CC) and/or Incremental Redundancy (IR). CC may be a basic combining approach wherein the base station 105 may be simply retransmitting the exact same set of coded symbols of the original packet. With IR, different redundancy information may be sent during retransmissions by recoding the packet in a different manner, thus incrementally increasing the coding gain. To improve the speed of HARQ processing, the functionality may be implemented directly at the physical/Media Access Control (L1) layer of the mobile device 110.

The network 100 depicted in the figure is merely exemplary and may include any system that allows communication over-the-air and/or via a fixed cable and/or wire communication paths between and among components. For example, exemplary over-the-air interfaces may include Wi-Fi, WiMAX, and/or UMB (ultra mobile broadband). Mobile device 110 and base station 105 may be embodied in the form of many different types of wired and/or wireless devices, including one or more of a telephone, cellular telephone, wirelessly connected computer, PDA (personal digital assistant), pager, navigation device, music or video content download unit, wireless gaming device, inventory control unit, or other like types of devices communicating wirelessly via the air interface. Cellular or other wireless telecommunication services may communicate with a carrier network through a data link or other network link.

Figure 2:
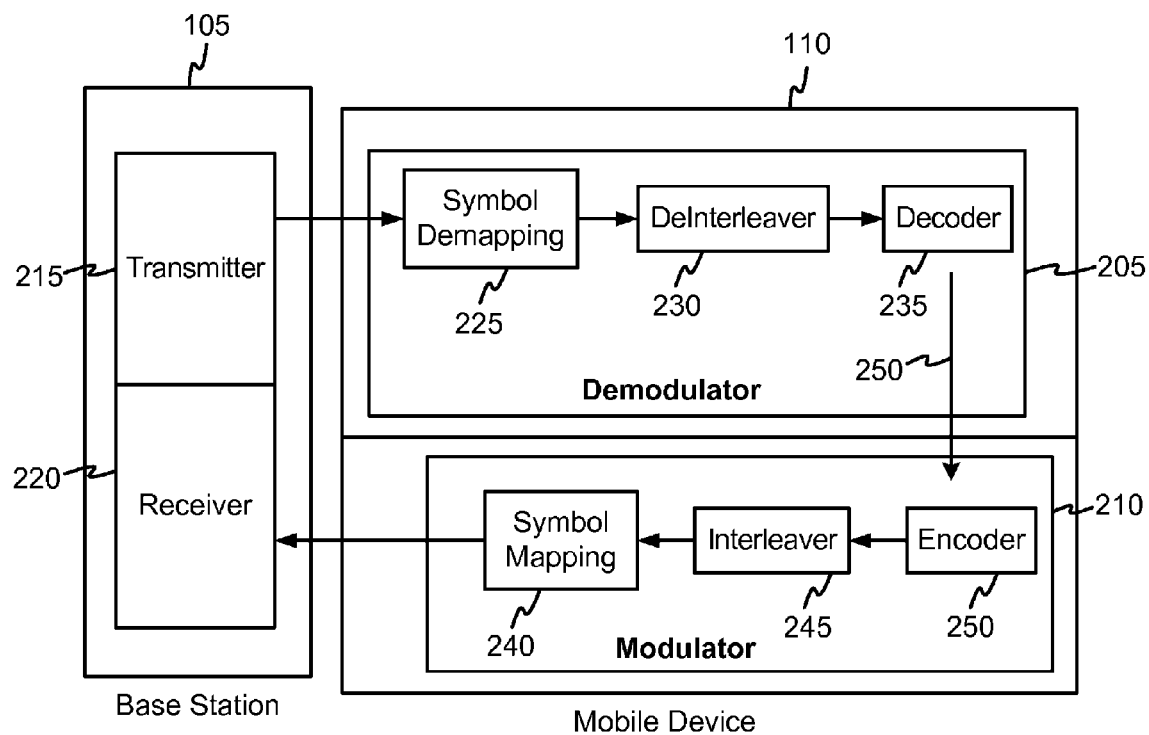
FIG. 2 shows a block diagram showing exemplary conventional transmitter and receiver components in a base station and a mobile device.

FIG. 2 is a block diagram showing some conventional transmitter and receiver components within the base station 105 and the mobile device 110. The terms "transmitting entity" (or "transmitter") and "receiving entity" (or "receiver") as used herein, refer to a communication station/device's relationship to a particular packet, e.g., a corrupted packet. The transmitting entity is the communication station or device that sent the packet. The receiving entity is the communication station or device that receives the packet, or, in the case of a corrupted packet, is intended to receive the packet. A device engaging in two-way communications is a transmitting entity for some packets and a receiving entity for other packets. Transmitting entities have both receiving circuitry and transmitting circuitry, as do receiving entities. Transmitting entities and receiving entities may be, for example, wireless communications stations (e.g., mobile stations) or may be fixed stations communicating via cables or wires.

As shown in FIG. 2, both base station 105 and mobile device 110 include a transmitter and a receiver. At the level of detail described for FIG. 2, the modulator and demodulator for both the transmitter 215 and receiver 220 in base station 105, include similar components and work in a related manner, as the modulator and demodulator in transmitter 205 and receiver 210, respectively, included in the mobile device 110. For brevity, only the details of the mobile device's 110 modulator and demodulator are described below.

The demodulator within the receiver 205 of mobile device 110 may include a symbol demapping module 225, a deinterleaver 230, and a decoder 235. The transmitter 210 includes a modulator which may include a symbol mapping module 240, an interleaver 245, and an encoder 250.

A packet may be transmitted by the base station's 105 transmitter 215 and is initially received and processed by receiver's 205 RF and digitizing components (not shown). The packet may then symbol demapped by the symbol demapping module 225 to processes the incoming In-phase (I) and Quadrature (Q) components of the modulated signal, which represent symbols, and convert the modulated symbol into binary values (bits). The packet may then be passed to deinterleaver module 230 which arranges the signal into its proper order, in either the time and/or the frequency domain, to reverse the interleaving operations which may be performed at the transmitter 215. The packet may then be passed to decoder 235 for error detection and correction processing. Decoder 235 may be, for example, a turbo-decoder or a low density parity check (LDPC) decoder, which may provide highly efficient error correction based upon redundant information sent with the original transmission of the packet. If an error is detected by the decoder 235 which cannot be corrected by the data contained in the original transmission, a decision may be made by the decoder 235 to request a HARQ retransmission via a signal 250. Once the request signal 250 is provided to the transmitter 210, a NACK response may be forwarded over the physical control channel 125 by the transmitter 210. The NACK may include one or more packets which are modulated by passing through the encoder 250, the interleaver 245, and the symbol mapping module 240. Once the NACK is received by the base station receiver 220, the base station transmits a HARQ retransmission via its transmitter 215. Once the HARQ retransmission is received by the decoder 235, it may use the retransmitted packet in conjunction with the original packet to correct the previously detected corrupted packet.

Because the conventional receiver 205 can make the error correction decision at the decoder 205 (or at the "back end" of the demodulator), after operations performed by the symbol demapping module 225 and the deinterleaver 230, a significant amount of latency may be encountered with a HARQ retransmission. The majority of this latency may be introduced by the deinterleaver 230.

As is described below in the description of the subsequent figures, embodiments of the invention may avoid this latency by providing another level of error detection/correction ahead of the symbol demapping module 225 and the deinterleaver 230 (or, as referred to herein, at the "front end" of the demodulator).

Figure 3:
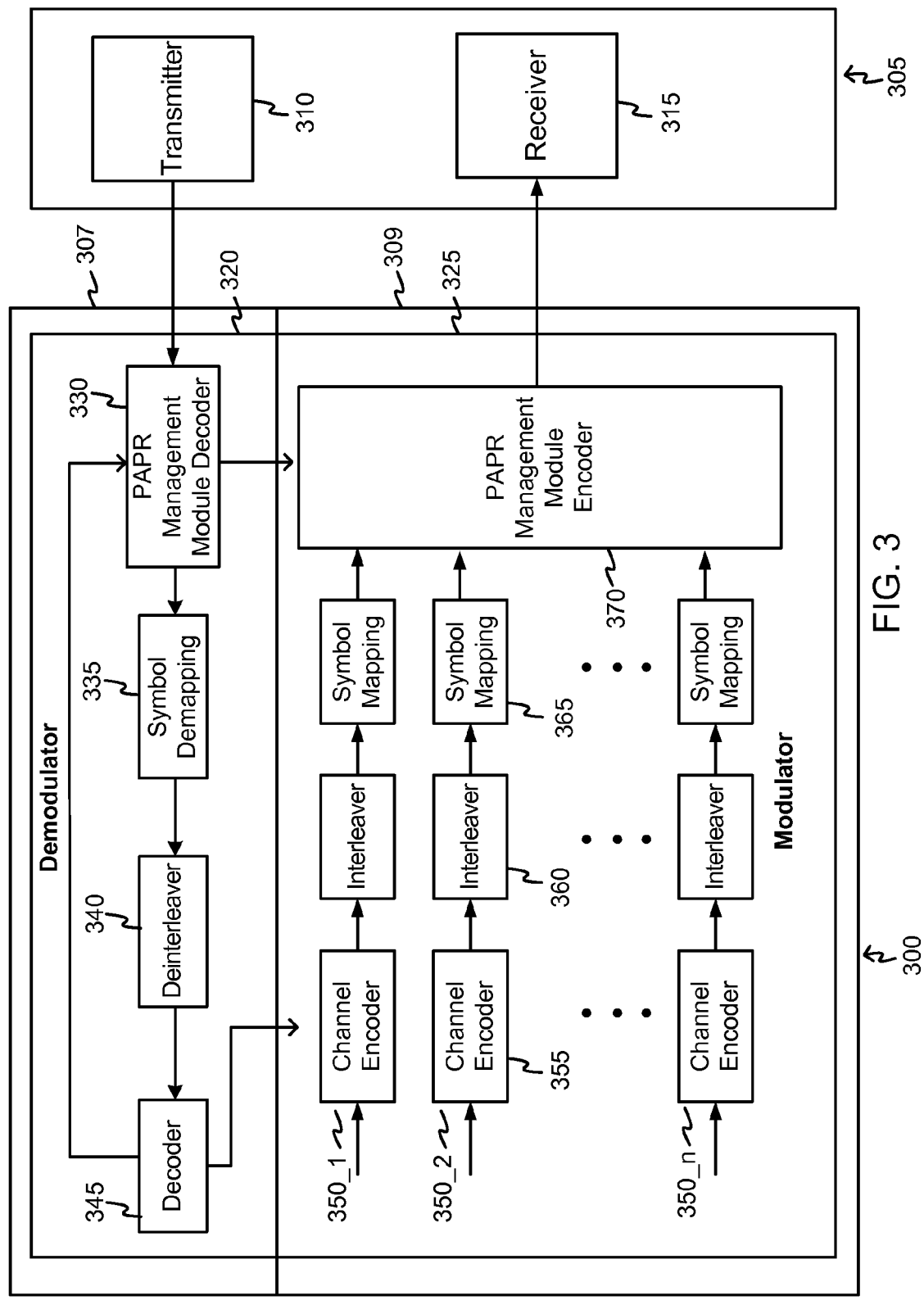
FIG. 3 depicts a block diagram of an exemplary multi-carrier modulator and demodulator capable of two levels of error correction.

FIG. 3 shows a block diagram of a multi-carrier modulator 325 and demodulator 320 which may be capable of two levels of error correction. The demodulator 320 and modulator 325 may be associated with a mobile device 300. The demodulator 320 may be included in the receiver 307 of the mobile device. The modulator 325 may be included in the transmitter 309 of the mobile device 300. Also shown are the transmitter 310 and receiver 315 which may be associated with base station 305.

As used herein, when describing operations with respect to a particular receiver, the transmitter proximate to that receiver may be called the "local" transmitter. The transmitter opposite to the particular receiver may be called the "distal" transmitter. For example, with respect to receiver 307, the local transmitter is transmitter 309, and the distal transmitter is transmitter 310 residing at the opposite side of the air interface. The same naming convention may be used when discussing a particular transmitter. For example, with respect to transmitter 310, the local receiver is receiver 315, and the distal receiver is receiver 307 residing on the opposite side of the air interface.

At the level of detail shown in FIG. 3, the transmitter 310 and the receiver 315 may include similar block-level components as shown in transmitter 309 and receiver 307, respectively, so details therein have been omitted below for ease of explanation.

Moreover, while the description of the receiver and transmitter of the embodiment shown in FIG. 3 is set forth in the context of the mobile device 300, similar components and operations may be mirrored in the transmitter and receiver of the base station 305. Exemplary differences between the components of the mobile device's transmitter 309 and receiver 307, and the base station's transmitter 310 and receiver 315, are discussed when the more detailed aspects of the embodiments are presented in the descriptions of FIGS. 6 and 7.

Further referring to FIG. 3, the demodulator 320 may include a Peak-to-Average-Power Ratio Management Module (PAPR MM) 330, a symbol demapping module 335, a deinterleaver 340, and decoder 345.

In accordance with various embodiments of the disclosure, the demodulator 320 may perform two levels of error detection/correction. A first level of error detection/correction is less computationally intensive to perform, and may be utilized when the channel quality indicator (CQI) is low. Moreover, the first level of error detection/correction may be performed at the "front end" of a receiver. A second level of error detection/correction may be more powerful and thus more computationally intensive. However, the second level of error correction may likely fail when the CQI is low. The second level of error detection/correction may be performed at the "back end" of a receiver.

After a packet error has been initially detected using conventional techniques which involve the aforementioned second level of error detection/correction, subsequent error(s) involving the same packet may be further detected utilizing the first level of error detection/correction, and thus bypassing the second level of error correction. During this occurrence, it may be safely assumed that the CQI is low, and repeating the second level of error correction again is unlikely to be successful both time and power may be saved. Details of the demodulator 320 are provided below, and details of the modulator 325 are provided thereafter.

Packets transmitted by the transmitter 310 of the base station 305 may be initially received by the RF and digitization portion of the receiver 307 (not shown) and then may be sent to the PAPR MM 330. The PAPR MM 330 may be included in the "front end" of the demodulator 320, and may initially perform PAPR decoding. In some embodiments, the PAPR MM 330 may receive additional side information to assist in the decoding, and if so, the PAPR MM may perform a first level of error detection/correction on the received side information. In either case, once the error detection is performed on the side information, the number of uncorrectable errors on the side information may be used in conjunction with a threshold to determine when to perform subsequent levels of error correction, as will be explained in more detail below.

If the number of errors relating to the side information does not exceed the threshold as described above, the PAPR decoding may be performed to reduce the peak power. Techniques for accomplishing this may include Selective Mapping (SLM), Blind Selective Mapping (used when side information is not transmitted, but derived from the packet data), Partial Transmit Sequences, and/or other conventional techniques used to minimize the peak to average power ratio.

SLM is a technique where the same information can be represented in different forms. Each of the different forms may be sequences having different peak-to-average power ratios (PAPR). The sequence having lowest PAPR may be chosen for transmission by the PAPR MM encoder 370. Because there are a plurality of sequences which may be transmitted, the PAPR MM encoder 370 may provided additional information to the PAPR MM decoder 330 which identifies the sequence which was selected. This additional information may be represented in what is term as side information. For example, if there are 10 different sequences that may represent the same information, and sequence 9 is selected because it minimizes the PAPR, then the side information may include the number 9, and this information may be sent to the receiver. In other techniques known as blind SLM, the side information is not sent along with the data, but may be estimated from the data itself using, for example, maximum likelihood estimators. In either case, obtaining the correct side information may be important for properly decoding the transmitted packet in the PAPR MM decoder 330. Accordingly, the side information may be protected through the utilization of error control codes, such as, for example, simple block codes, convolution codes, etc.

Further referring to FIG. 3, after PAPR decoding, the packet may be passed onto the symbol demapping module 335 and then the deinterleaver 340. The symbol demapping module 335 may processes the incoming I and Q components of the modulated signal, which represent symbols, and then convert the modulated symbol into bits. The deinterleaver 340 may arrange the signal bits into their proper order (in either the time and/or the frequency domain) to reverse the interleaving operations which may be performed by the modulator in transmitter 310.

The received packet may then be sent to the decoder 345 for a second level error detection and correction, which may include such algorithms as, for example, turbo decoding or low density parity check decoding (LPDC). The second level of error detection may be referred to as occurring at the "back end" of the receiver given its proximity in the processing chain. At the second level, the error detection/correction operations may be performed on the received bits demapped from the packet itself, and not on the side information as done at the first level of error detection/correction described above. If the decoder 345 detects an error in the packet, the decoder 345 may try to correct it using only the redundant information associated with received packet. If there was no error in the sent packet, or if the second level of error correction performed by the decoder 345 is successful, the corrected packet is passed on to subsequent stages of the mobile device 300 for further use.

When a packet which is retransmitted for the first time contains an uncorrectable error (which may occur when there is low CQI), and the second level of error correction is not successful, the demodulator 320 may initiate a first level error correction. Here, the decoder 345 may instruct the modulator 325 of the mobile device 300 to send a specific type of NACK to the receiver 315 of the base station 305. Because this type of NACK may originate from the front end of the receiver 307, it is referred to as a NACK Type 1. In response to the NACK Type 1, the transmitter 310 of the base station 305 may send a retransmission of the packet may includes symbols that have a different PAPR encoding, along with any appropriate side information. This retransmission comes from the PAPR MM encoder residing in the "front end" of the transmitter 310 (not shown, but the PAPR MM encoder is described in context of the mobile device's modulator 325 in more detail below). This retransmitted packet may also include error correction information for the side information. The error correction information for the side information may include, for example, ECC data for convolutional error correction. The symbols which are encoded by the PAPR MM encoder contain the same information as the original, but are formed differently that the previous transmission. The retransmission is received by the PAPR MM decoder 330 in the demodulator 320 of the mobile device 300, which can decode the packet. The PAPR MM decoder 330 may also perform error correction on the side information to ensure packet is properly decoded. The PAPR decoded packet may then be sent on to the subsequent blocks in the demodulator as described above.

The second level error correction involves HARQ processing which retransmits packets in response to receiving a NACK Type 2. This HARQ transmission may utilizes the encoder in the transmitter 325 (described in more detail below), and thus it "originates" from the back end of the transmitter (at the channel encoder 355). Depending upon the type of HARQ processing being used, the information in the retransmission may vary. However, most HARQ processes send some form of redundant information which may be processed with the corrupted packet in order to correct it. While HARQ processing is effective at correcting errors, it has the disadvantage of being time consuming because the retransmitted packet must at least pass through both the modulator and the demodulator again.

The first level detection/correction improves the efficiency of the demodulator because corrupted packets having a low CQI are effectively "filtered out" from the rest of the processing chain of the demodulator. Because of their low signal quality, the corrupted packet could not have been corrected using the second level of correction at the decoder 345. Thus the first level correction/detection avoids needlessly processing the corrupted packet through the symbol mapping module 335, the deinterleaver 340 (which may be especially time consuming), and finally the decoder 345. This tiered approach to error detection/correction may save time, power (especially useful for mobile devices) and computational resources of the communication system.

Further referring to FIG. 3, the transmitter 309 of the mobile device 300 may include a multi-carrier modulator 325, which includes a plurality of channels 350_1 through 350_n. The number of channels "n" may be a function of the desired capacity of the communication system, and may be any number within practical limits. In various embodiments, the number of channels may be 128 to 2048 or higher. The modulator 325 may be used in systems employing CDMA, OFDM, OFDMA, WiMAX, UMB, etc.

Each channel may include a channel encoder 355, an interleaver 360, and a symbol mapping module 365. The channels may feed into a PAPR MM encoder 370 which provides the signal for transmissions to the receiver 315 in the base station 305.

The channel encoder 355 may provide (second level) error correction functionality using, for example, a turbo encoder. The interleaver 360 may change the order in time or frequency of the data to provide time or frequency diversity. This may provide protection against multipath or deep fade effects. The symbol mapping module 365 may map data bits into modulation symbols. The symbol mapping module may include, for example, QAM, Q-PSK, and/or other modulation methods. The PAPR MM encoder 370 may provide peak power management using SLM, blind SLM, PTS, and/or other conventional methods. The PAPR MM encoder 325 may also provide error correction coding when transmitting side information. In other embodiments, the side information may not be transmitted, but instead is derived from the received data.

When the demodulator 320 requests a first level retransmission which was decided at the demodulator's 320 front end by the PAPR MM decoder 330, the PAPR MM encoder may provide the retransmission by, for example, selecting an alternative mapping which satisfies the peak to average power requirement, and contains the same information as the original transmission. This first level retransmission may improve the efficiency of the error correction because it may obviate processing the packet by the back end of the modulator (e.g., the channel encoder, the interleaver, and the symbol mapping module) in the transmitter 310.

If the demodulator 320 requests a second level retransmission (a HARQ retransmission), which is decided at the receiver's 307 back end by the decoder 345, the transmitter 310 has the channel encoder (not shown) perform the error correction (i.e., the retransmitted packet originates at the back end). The retransmitted packet is subsequently processed by the rest of the modulator's processing chain through the PAPR MM encoder, wherein after it is transmitted back to the receiver 320 in the mobile device 300.

Figure 4A:
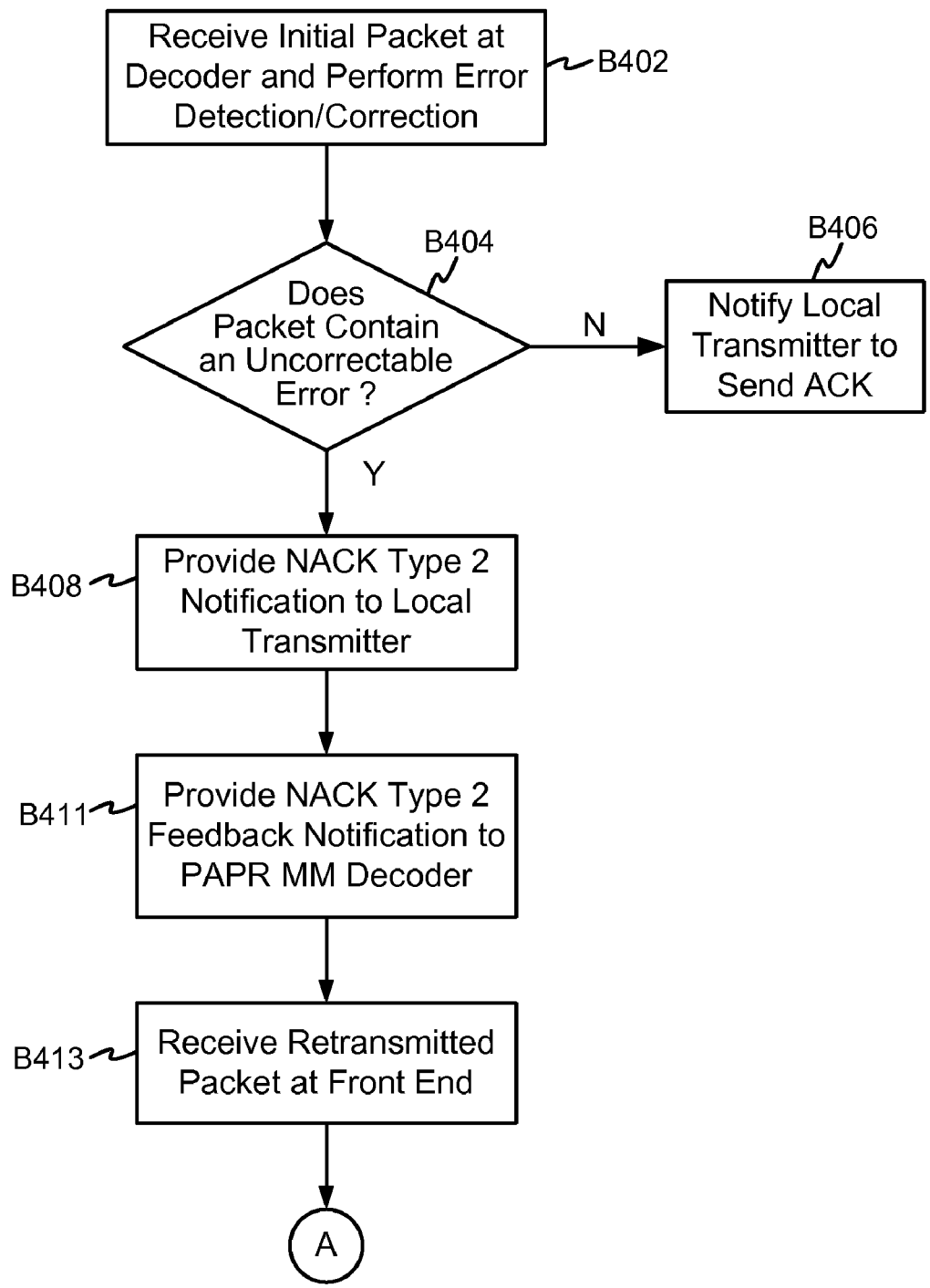
FIGS. 4A and 4B show a flow chart of an exemplary process which may be associated with an exemplary demodulator.

FIG. 4A shows a flow chart of exemplary process 400A which may be associated with the demodulator 320 when a packet is initially received, and the Channel Quality Indicator (CQI) may be low. At the level of detail presented below, it should be appreciated that this general process may occur in a demodulator associated with the mobile device or the base station; however, the explanation and the reference numbers used in the following description are associated with the mobile device 300 for ease of explanation.

An initial packet may be received at the receiver 307, and pass through the PAPR MM Decoder 330, the Symbol Demapping 335, and the Deinterleaver 340 modules. As used herein, the term "initial packet" may describe a packet which has not yet been retransmitted in request to any decoding and/or error correction operation(s). The initial packet may then be received at the decoder 345, and Error detection/correction may be performed (Block 402). As described earlier, the Decoder 325 may use Turbo Decoding, LPDC, and/or any other conventional method to accomplish this task. As described above, this type of correction is the second level of error correction which occurs at the back end of the demodulator 320. The Decoder 325 may then determine if the initial packet contains an error which it cannot correct given the redundant information which may have been sent with the initial packet transmission (B404). If the packet can be corrected, the receiver 307 may notify the local transmitter 309 to send an ACK to the base station 305 receiver 315 (B406). If the decoder 345 determines in B404 that the packet cannot be corrected, the Decoder 345 may notify the local transmitter 309 to send a NACK Type 2 to the base station 305 receiver 315 (B408). The Decoder 345 may also provide a NACK Type 2 feedback notification to the PAPR MM Decoder 330, so it may be initialized to perform subsequent first level error detection/correction if the need arises (B411). This initialization may include resetting one or more statistical parameters (e.g., counter(s)) which may be used in threshold calculations described below. After the base station 305 receiver 315 receives the NACK Type 2, it will notify the base station 305 transmitter to retransmit the packet, and in doing so will be re-encoded by the transmitter's 310 turbo encoder (i.e., in response to the NACK Type 2, the packet will be retransmitted from the back end of the transmitter 310). The mobile device 300 receiver 307 may then receive the retransmitted packet (B413), which may be processed by the PAPR MM Decoder 330, the Symbol Demapping module 335, the Deinterleaver 340, and then presented to the Decoder 345. The method may continue to process 400B described below.

Figure 4B:
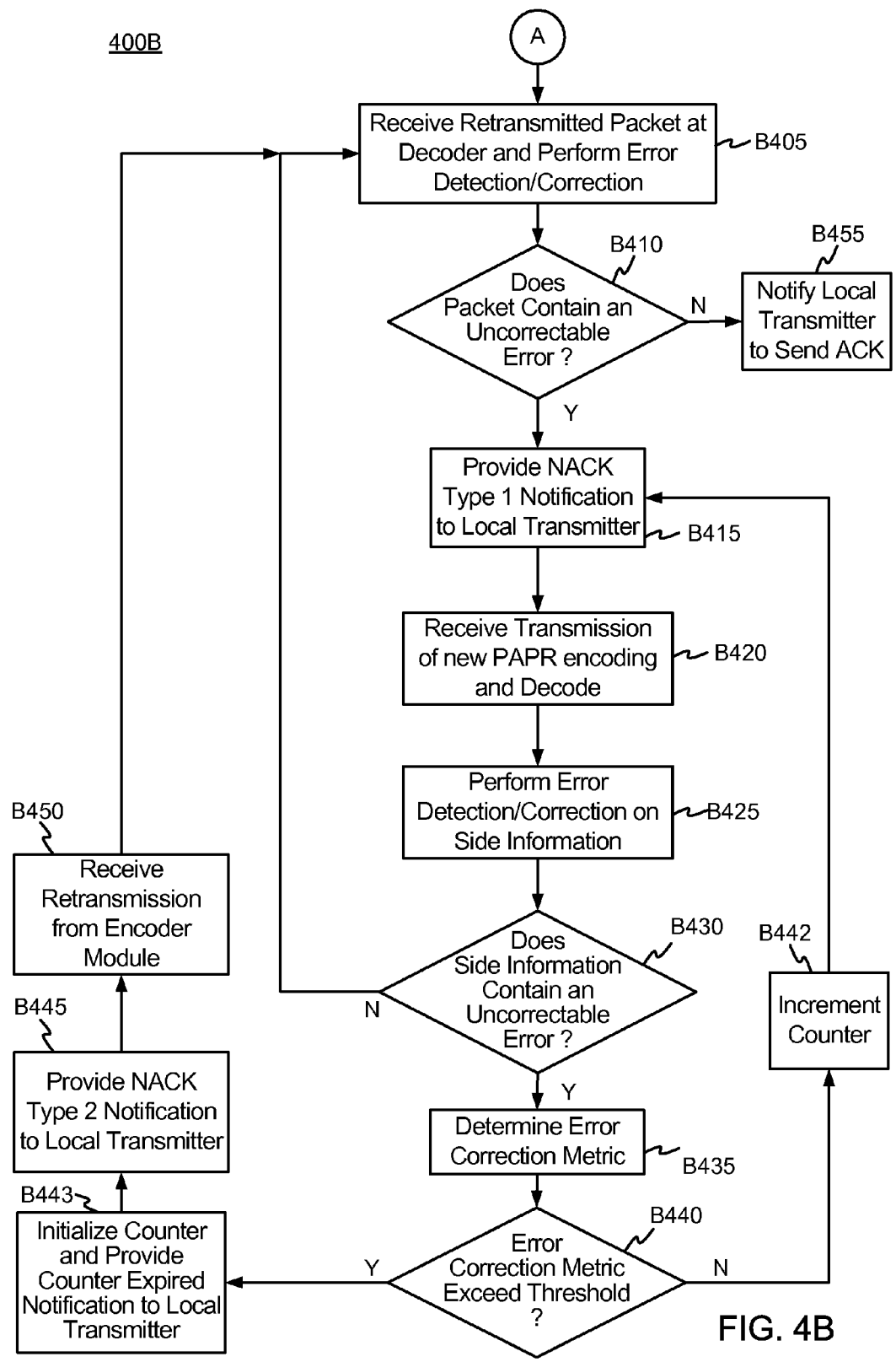

FIG. 4B shows a flow chart of exemplary process 400B which may be associated with the demodulator 320, where the CQI may be low and after the initial packet has been received and a retransmission has been requested. As in the description of FIG. 4A, at the level of detail presented below, it should be appreciated that this general process may occur in a demodulator associated with either the mobile device or the base station; however, the explanation and reference numbers used in the following description are associated with the mobile device 300 for ease of explanation.

Process 400B may begin by receiving a packet at the decoder 345 which may perform the second level error detection correction (Block 405). If the packet contains no error, or if it is determined that packet contained an error which could be corrected by the decoder 345 (B410), then the decoder 345 may provide a notification to the local transmitter 309 to send an ACK to the base station 305 (B455). If it is determined that the packet was corrupted and could not be corrected by the decoder 345 in B405, then the demodulator 320 may notify the transmitter 309 to send a NACK Type 1 to the base station 305 (B415). For example, this notification may be initiated at the Decoder 345, which may provide the notification to the PAPR MM Decoder 330, which may in turn forward the notification to the PAPR MM decoder 370. The PAPR MM decoder may generate the NACK Type 1 which may be subsequently transmitted by the transmitter 309 to the base station 305 receiver 315.

In response to the NACK Type 1 being sent, a transmission including a new PAPR encoding of the same symbol may be received at the front end of the demodulator 320 (B420). In some embodiments, additional side information may also be received to assist in the PAPR encoding (e.g., SLM decoding). In other embodiments, no side information may be received (e.g., blind SLM decoding). The new PAPR encoding may be generated by a PAPR MM encoder residing in the base station transmitter 310, which may be decoded by the PAPR MM decoder 330 (B420). In some embodiments, the PAPR decoding may utilize SLM along with received side information. In other embodiments, blind SLM may be used to derive the side information from the received data itself. Known techniques, such as, for example, maximum likelihood estimation, may be used to derive an estimate of the side information. The PAPR MM decoder 330 may further perform error detection/correction on the side information if the side information was transmitted along with the new PAPR encoding, as in, for example, conventional PAPR SLM techniques (B425). This operation may be performed using known error detection and convolutional error correction code techniques (ECC). Alternatively, if blind SLM is being used for PAPR encoding/decoding, and no side information was actually transmitted, "error detection" may be based on the confidence in the estimated side information (B425). The confidence may be estimated by using known statistical estimators which may vary depending upon type of modulation (QAM, PSK, etc.) used for symbol mapping and demapping. If an error was detected in the side information (or a low measure of confidence was calculated), the PAPR MM decoder 330 may attempt to correct this error in the side information (B425).

The PAPR MM decoder 330 may then determine if the side information contains an uncorrectable error (or has an unacceptably low measure of confidence if blind SLM is being used) (B430). If the side information was correctable, the PAPR demapping performed by the PAPR MM Decoder 330 may have been successful. At this point, the first level of error correction is complete, and the PAPR decoded packet itself may have error detection/correction performed on it at the decoder 345. Here, the transmitted data packet, and not the side information, may undergo error detection/correction.

If it is determined that the side information contains an error which is not correctable using the ECC information (B430), an error metric may be computed (B435). The error metric may be determined by keeping a running sum (e.g., using a counter) of the number of erred side information values provided by the PAPR MM decoder 330. This metric may be compared to a threshold value (B440). This may be used to make a decision regarding which approach the receiver 300 will use as a next step in the error detection/correction process (i.e., try again with level 1 detection/correction having a NACK Type 1 sent, or use level 2 detection/correction in association with a HARQ retransmission by having a NACK Type 2 sent).

The threshold value used in the above determination may be computed in a variety of different ways. One exemplary threshold value (T) may be computed by the following equation:

$$T=(N/n)*k*(E_c/N),$$

where
   N: is the length of the backend encodes used in decoder 410;
   n: is the symbol length used in the PAPR MM encoder 425;
   k: is the mapping information length used in the PAPR MM encoder 425; and
   $E_c$: is the error correction capability of the backend decoder 410.

If it is determined that the error metric computed in B435 does not exceed the threshold (T) in B440, the sum may be increased by incrementing the counter (B442). Afterwards, the level 1 error detection/correction process may reiterate by transferring control back to B415 where another NACK Type 1 may be sent to the transmitter 400. Any counters may also be incremented keeping track of the number of times the side information (either received or derived) was found to be defective.

If the determination in B440 finds that the error metric computed in B435 exceeds the threshold (T), the counter may be initialized and a notification may be provided to the local transmitter that the counter has exceeded the threshold and thus expired (B443). The level 2 error detection/correction process may then be started by having the receiver 307 notify the local transmitter 309 to send a NACK Type 2 to the base station 305 (B445). The receiver may then receive a retransmission of the packet itself, which may originate from the back end of the base station transmitter 310 (i.e., at the base station's channel encoder) (B450). Once the retransmitted packet passes through the PAPR MM Decoder 330, the Symbol Demapping module 325, and the Deinterleaver 340, control may then be transferred to B405, where the decoder 345 performs the level 2 error detection/correction at the back end of the demodulator 320.

Figure 5:
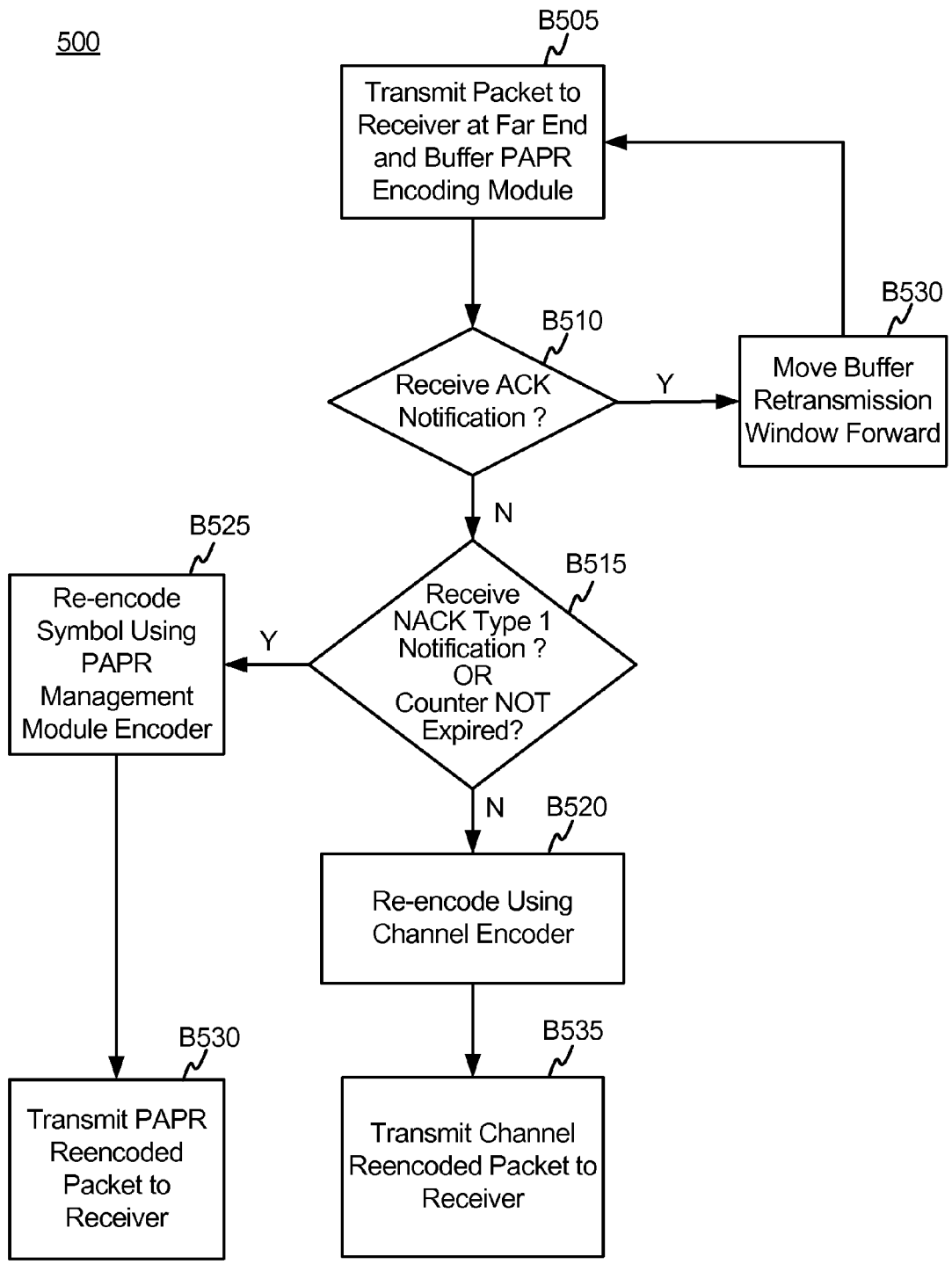
FIG. 5 shows a flow chart of an exemplary process which may be associated with an exemplary modulator.

FIG. 5 is a flow chart of an exemplary process which may be associated with a modulator. At this level of detail, the modulator may be either in the mobile device 300 or in the base station 305 (not shown in FIG. 3). For consistency with the example described in FIGS. 4A and 4B, the exemplary process 500 may execute on modulator 325 of the mobile device 300 (i.e., in the transmitter 309 "local" to receiver 307). A packet may be transmitted to the receiver 315 of the base station 305 (e.g., the "far" receiver across the air interface) from the mobile station transmitter 325 (Block 505), and the associated symbol may be buffered in the PAPR MM encoder 370. Once the packet is processed at the receiver 315, and the status of the packet is determined, a NACK Type 1, NACK Type 2, or an ACK may be received at receiver 307 from the far transmitter 310, depending upon the status of the packet. The receiver 307 in the mobile device 300 may then send the appropriate notifications to the local transmitter 309 in the mobile device 300.

If the transmitter 309 determines an ACK notification was provided by the receiver 307 (B510), the transmitter may proceed to the next packet by moving the buffer retransmission window forward (B530). If an ACK notification was not received in B510, the transmitter 309 may check to see if the receiver 307 provided a NACK Type 1 notification, or if an expired counter notification was NOT received (B515). If a NACK Type 1 notification was received, or if a expired counter notification was not received, then level 1 error correction/detection may be desired, and a retransmitted PAPR encoding of the same symbol is formed by the PAPR MM encoder 370 in the transmitter 309 (B525). This newly PAPR re-encoded packet may then be subsequently transmitted to the receiver 315 at the base station 305 (B530).

If the transmitter 309 determines in B515 that a NACK Type 1 notification was not provided by receiver 307, then a NACK Type 2 notification may have provided by the receiver 307. Alternatively, an expired counter notification may have been provided by receiver 307. In either of these cases, the packet may be re-encoded by the channel encoder 350 (e.g., using a turbo encoder) in transmitter 309 (B550). This newly channel encoded packet may then be sent by transmitter 309 over the air interface to the receiver 315 (B535).

Figure 6A:
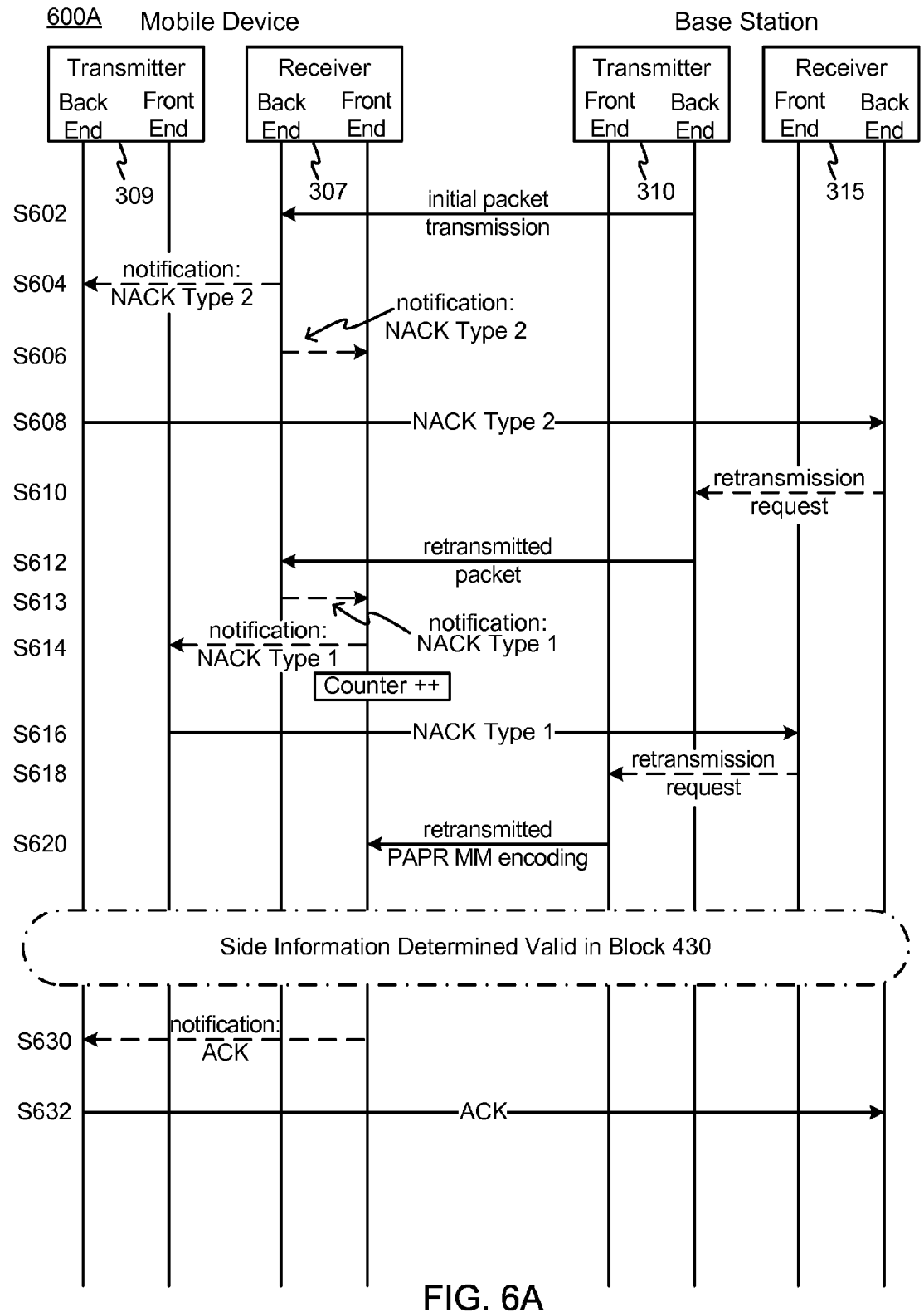
FIGS. 6A-6C show signal flow diagrams associated with the exemplary processed described in FIGS. 4 and 5.
Figure 6B:
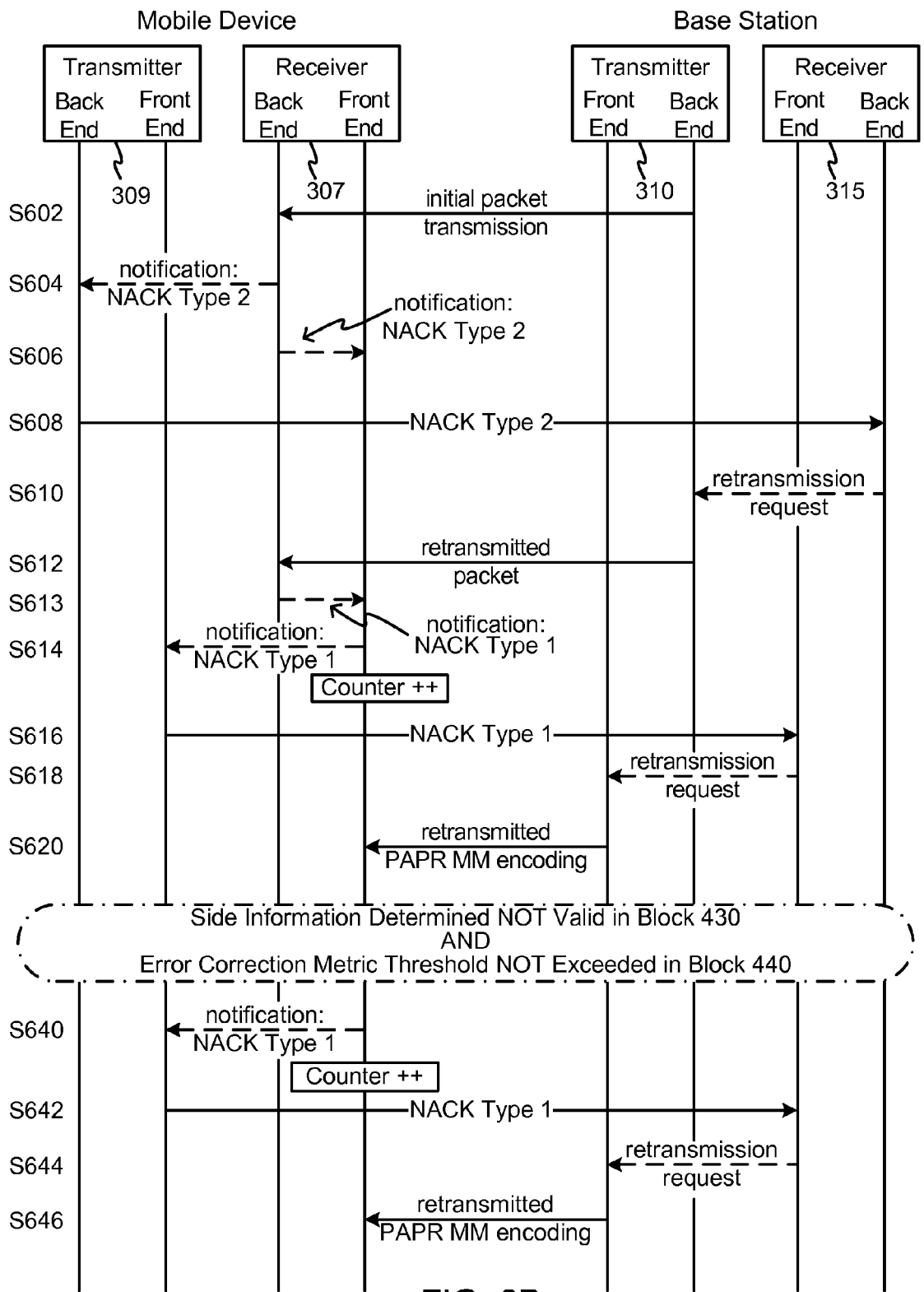
Figure 6C:
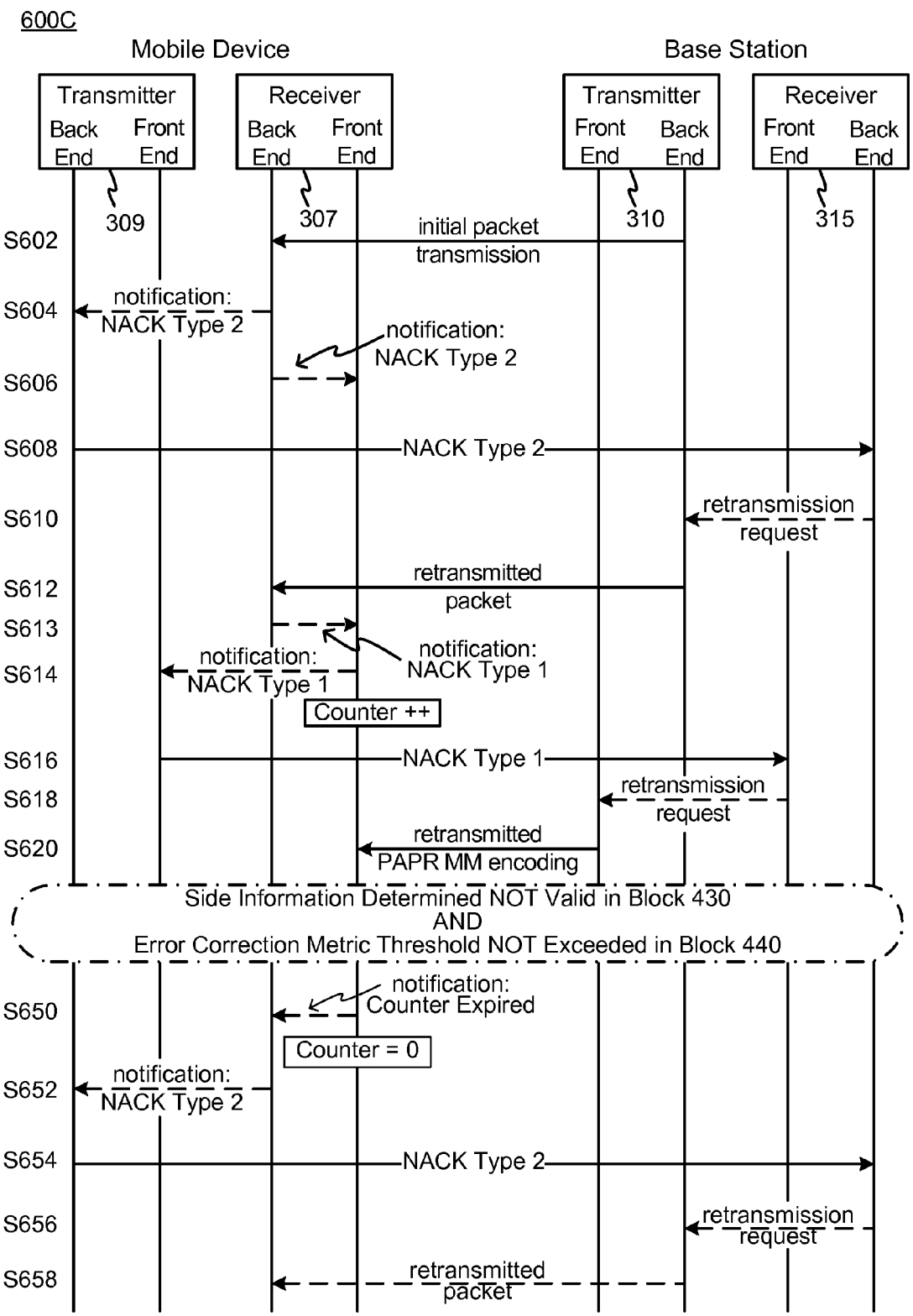

FIGS. 6A-6C show signal flow diagrams 600A-600C associated with the exemplary processes described in FIGS. 4 and 5. Each diagram indicates where in terms of the front end of a device, or a back end of a device, a transmission or notification is beings sent from, and to where it is provided. Three different cases are provided based upon what determinations are made in conditional blocks B430 and B440 as shown in the flowchart FIG. 4. As will be described in more detail below, each of these diagrams assumes that an error occurred on both the initially transmitted packet (602) and the initially transmitted packet's first retransmission (612). Dashed lines shown in FIGS. 6A-C may represent notifications happening within a single communications entity. These notifications may be implemented, for example, using various signals, bit codings, "internal" NACKs, etc. Solid lines may represent transmissions and/or receptions occurring between communications entities. In the example shown in FIGS. 6A-6C, the solid lines represent communications occurring across the air interface between the mobile device 300 and the base station 305.

In FIG. 6A, signal flow diagram 600A shows the signal flows when it is determined that the side information (either transmitted or derived) is valid in block B430 as shown in FIG. 4B.

The transmitter 310 of the base station 305 may send an initial packet transmission S602. The initial packet may be encoded at the back end of the transmitter 310 prior to being sent across the air interface to the receiver 307. The receiver 307 may decode the initial packet at the back end of the receiver (e.g., in the decoder 345). As described above, we will assume the back end of the receiver 307 determines the initial packet contains an uncorrectable error. As a result, the back end of the receiver 307 may then provide a NACK Type 2 notification to the back end (e.g., the channel encoder 350) of the transmitter 309 S604. The back end of the receiver may also provide a NACK Type 2 notification to the front end of the receiver (e.g., PAPR MM Decoder 330) in order to initial it for first level error detection/correction operations S606. In response to the NACK Type 2 notification S604, the transmitter 309 may then send a NACK Type 2 across the air interface to the base station receiver 315, which may be processed at the receiver's 307 back end S608. The receiver 315 may provide a retransmission request to the back end of the base station's transmitter 310. In response, the transmitter 310 will retransmit the packet which is re-encoded at the back end of the transmitter 310 S612. Here, the re-encoding may take place in the channel encoders.

Assuming the retransmitted packet also contains an uncorrectable error; the back end of the receiver 307 may detect the error, and can send a notification to the front end of the receiver 307 that a NACK Type 1 should be provided to the base station S613. The front end of the receiver 307 may provide a notification to the PAPR MM encoder 370 of the transmitter 309 that a NACK Type 1 should be transmitted S614. Note that after S614, the NACK Type 1 counter may be incremented. This notification may be provided via the PAPR MM decoder 320 in receiver 307. The transmitter 309 at the front end may then transmit a NACK Type 1 to the receiver 315 S616. This NACK Type 1 may be processed at the front end of receiver 315, which may in turn provide a retransmission request to the front end of transmitter 310 S618. In response to the retransmission request S618, the front end of the transmitter 310 may transmit a packet which is re-encoded by the PAPR MM encoder residing in base station 305 S620. This new PAPR encoding occurs on the same symbol, and may only needs to be decoded by the front end of receiver 307 in the PAPR MM Decoder 330. At this time, the PAPR MM Decoder may determine if the side information is valid. As described above in FIG. 4, this determination may be made in Block 430. It may be performed using error detection/correction if the side information was actually transmitted as it is for SLM. Alternatively, the side information may have been derived if blind SLM is used, and therefore a statistical metric may be calculated to determine the validity of the derived side information. If it is determined that the side information is valid, the PAPR MM Decoder 330 at the front end of the receiver 307 may notify the back end of the transmitter 309 to transmit an ACK to the base station 305 S630. The transmitter 309 may respond by transmitting the ACK to the receiver 315 at the base station 305, which may be decoded at this receiver's back end.

In FIG. 6B, signal flow diagram 600B shows the signal flows when it is determined that the side information (either transmitted or derived) is not valid in block B430, and the error correction metric is not exceed in B440, as shown in FIG. 4B. The signals S602 through S620 may be the same as described above, and need not be repeated.

If in Block 430 shown in FIG. 4B, it is determined that the side information is not valid, and it is further determined that the error correction metric threshold is not exceeded in Block 440, the following signal flows may occur. Initially, the front end of the receiver 307 may notify the front end of the transmitter 309 to transmit a NACK Type 1 S640. This may be done by the receiver's PAPR MM decoder 330. In addition, the PAPR MM decoder 330 may increment the counter to track the number of NACK Type 1 notifications that have been sent. The front end of the transmitter 309 may respond by transmitting a NACK Type 1 S642. This NACK Type 1 may be processed by the front end of the base station's receiver 315. The front end of the receiver 315 may provide a retransmission request to the front end of transmitter 310 S644. In response, the front end of the transmitter 310 may transmit data which has been re-encoded by the PAPR MM encoder of the transmitter 310 S646. The retransmitted PAPR re-encoding may be decoded at the front end of the receiver 307 in the PAPR MM Decoder 330.

In FIG. 6C, signal flow diagram 600C shows the signal flows when it is determined that the side information (either transmitted or derived) is not valid in block B430, and the error correction metric is exceed in B440, as shown in FIG. 4B. The signals S602 through S620 may be the same as described above, and need not be repeated here.

Initially, the receiver 307 front end may send a notification to the receiver's 307 back end to prepare a NACK Type 2 S650. The front end may also initialize the NACK Type 1 counter to zero. The receiver's 307 back end may in turn notify the back end of transmitter 309 to generate a NACK Type 2, which the transmitter 309 will subsequently transmit S654. This NACK Type 2 may be decoded by the back end of receiver 315 at the base station. The back end of the receiver 315 may provide a retransmission request to the back end of the transmitter 310 S656. The transmitter 310 may re-encode the packet at the back end using the channel encoders, and then retransmit the channel re-encoded packet S658. This packet may be decoded at the back end of the receiver 307.

Figure 7A:
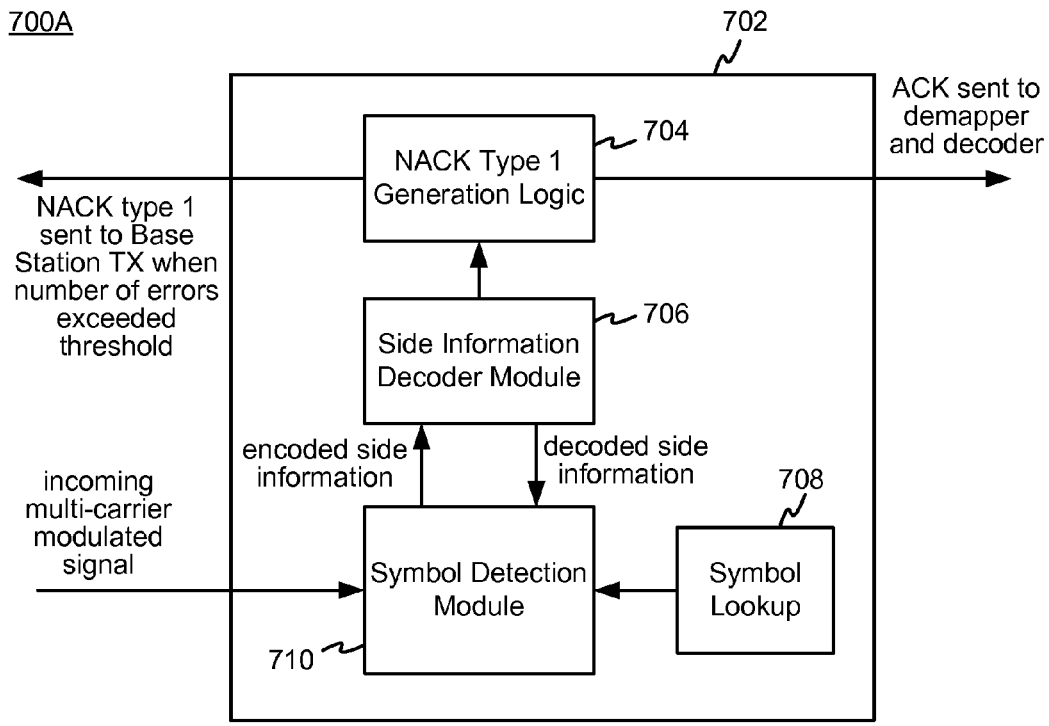
FIG. 7 shows block diagrams of exemplary peak-to-average-power ratio manager module decoder and encoder associated with a receiver and transmitter, respectively, in a mobile device.
Figure 7B:
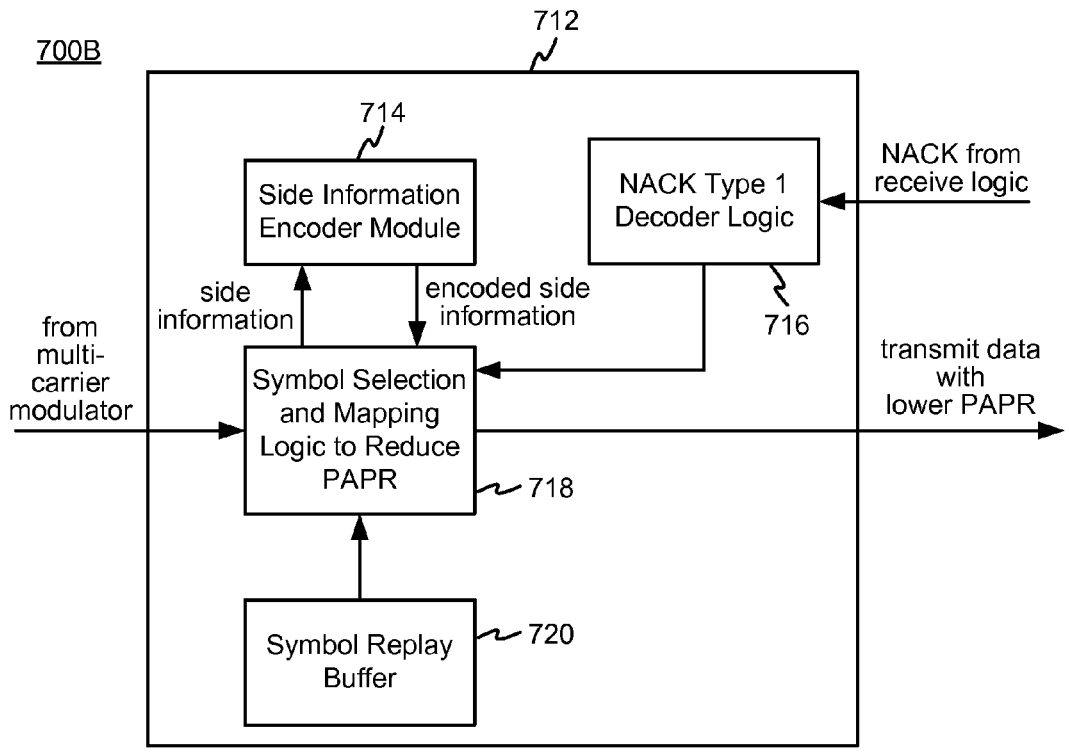

FIGS. 7A and 7B show block diagrams of exemplary peak-to-average-power ratio manager module associated with a mobile device which may facilitate the first level of error correction. FIG. 7A shows a PAPR MM decoder 702 which may reside in a receiver of a mobile device. An incoming multi-carrier modulated signal may be received by the symbol detection module 710. If side information is included in the incoming signal, it may be check for errors and decoded in the side information decoder module 708. The side information decoder module 706 may provide decoded side information back to the symbol detection module 710, which may decode the PAPR encoded signals using the side information and the symbol look-up module 708.

If no side information is transmitted with the incoming signal (e.g., as in blind SLM), the side information may be derived in the side information decoder module from the incoming signal data itself. Moreover, the derived side information may be validated using standard statistical methods in block 706. Once the side information decoder module 706 derives the side information, it may be provided to the symbol detection module 710, and the PAPR decoding may proceed as described above.

If the side information decoder module determines the quality of the side information, the NACK Type 1 generation logic module 704 may signal the local mapper and decoder to send an ACK. The ACK may not necessarily be an explicit signal or packet. It may implicit in that by just sending the PAPR output to the decoder, the ACK may be assumed.

If the NACK Type 1 generation logic module 704 may maintain a counter of hoe often the side information is invalid. If this counter produces a metric which exceed a threshold, a NACK Type 2 may be sent to the base station transmitter. If the metric is not exceeded, a NACK Type 1 may be sent to the base station transmitter.

FIG. 7B shows a PAPR MM encoder 712 which may reside in a transmitter of a mobile device. An incoming signal is provided from the multi-carrier modulator to the symbol selection and mapping logic module (SSMLM) 718, which produces PAPR encoded data to reduce peak power levels. The SSMLM 718 uses a symbol replay buffer 720 to assist in finding the proper encoding which minimizes the peak power. The SSMLM 718 also may provide side information if SLM is being used, to the side information encoder module 714 to perform error correction encoding, such as, for example, convolutional ECE. If blind SLM is being used, no side information may be encoded or transmitted. After error encoding, the side information may be passed back to the SSMLM 718, and then provided downstream for transmission to the base station receiver. The NACK Type 1 Decoder Logic Module (N1DLM) 718 may receive a NACK Type 1 notification from the receiver, and will instruct the SSMLM 718 to transmit the same symbol using a different PAPR encoding.

Figure 8A:
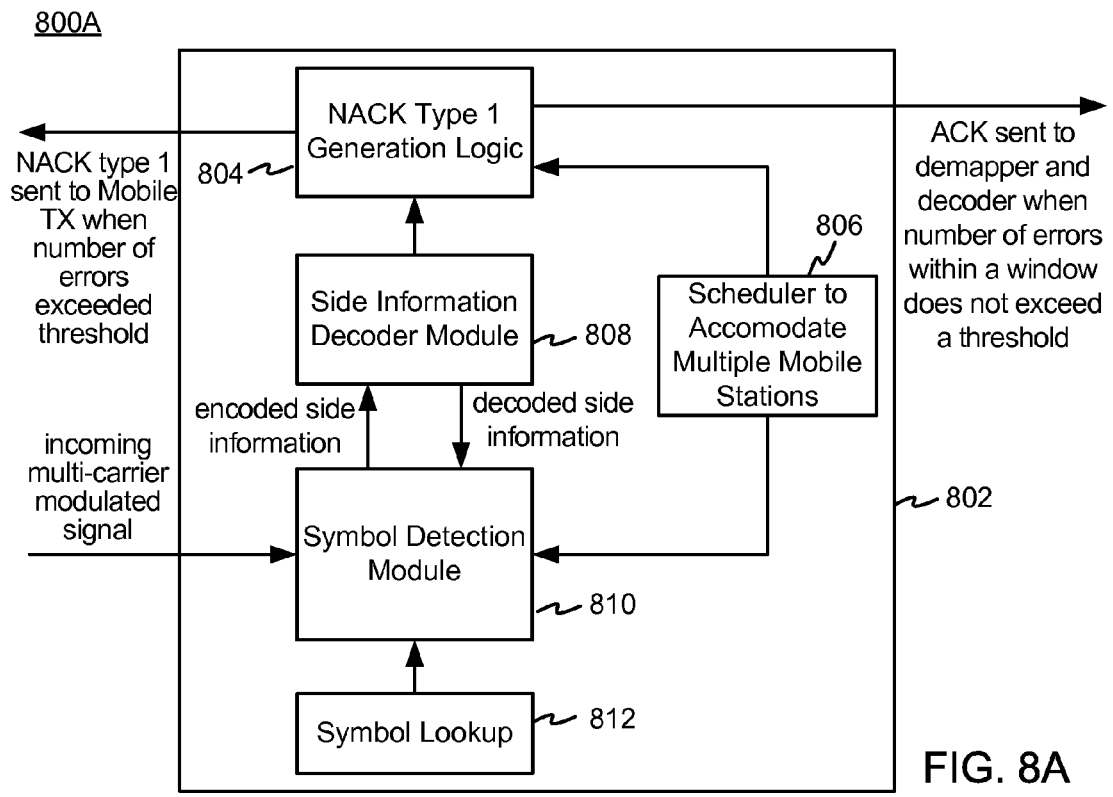
FIG. 8 shows block diagrams of exemplary peak-to-average-power ratio manager module decoder and encoder associated with a receiver and transmitter, respectively, in a base-station.
Figure 8B:
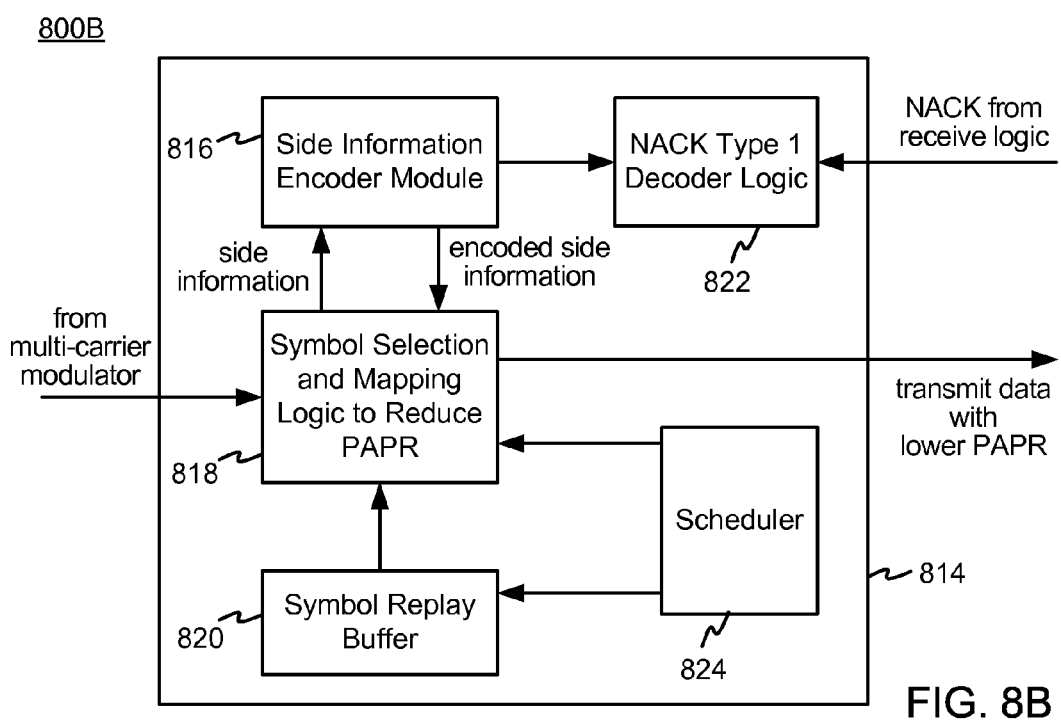

FIGS. 8A and 8B show block diagrams of exemplary peak-to-average-power ratio manager module associated with a base station which may facilitate the first level of error detection/correction. FIG. 8A shows the base station receiver 802 which may receive an incoming multi-carrier demodulated signal at the Symbol Detection Module (SDM) 810. Using the symbol lookup module 812, the SDM 810 may perform PAPR encoding to reduce peak power levels. If SLM is being used in SDM 810, the incoming signal may include encoded side information which may be decoded by the Side Information Decoder Module (SIDM) 808. The SDIM 808 may decode the side information and then check for errors. The side information decoder module 808 may provide the decoded side information back to the symbol detection module 810, which may decode the PAPR encoded signals using the side information and the symbol look-up module 812.

If no side information is transmitted with the incoming signal (e.g., as in blind SLM), the side information may be derived in the side information decoder module from the incoming signal data itself. Moreover, the derived side information may be validated using standard statistical methods in block 808. Once the side information decoder module 808 derives the side information, it may be provided to the symbol detection module 810, and the PAPR decoding may proceed as described above.

If the side information decoder module determines the quality of the side information, the NACK Type 1 generation logic module 804 may signal the local mapper and decoder to send an ACK when the number of errors within a window does not exceed a threshold (e.g., the error correction metric threshold). The ACK may not necessarily be an explicit signal or packet. It may implicit in that by just sending the PAPR output to the decoder, the ACK may be assumed.

If the NACK Type 1 generation logic module 804 may maintain a counter of how often the side information is invalid. If this counter produces a metric which exceed a threshold, a NACK Type 2 may be sent to the base station transmitter. If the metric is not exceeded, a NACK Type 1 may be sent to the base station transmitter.

In addition to performing the above functions, the base station receiver 702 may schedule the transmission of the NACK Type 1, NACK Type 2, and ACK packet data from different mobile stations using the Scheduler module 806. In some cases, the base station may turn off NACK Type 1 functionality to mobile devices which cannot accommodate the first level error detection.

FIG. 8B shows an exemplary PAPR MM encoder 814 which may reside in a transmitter of a base station. An incoming signal may be provided from the multi-carrier modulator to the symbol selection and mapping logic module (SSMLM) 818, which produces PAPR encoded data to reduce peak power levels. The SSMLM 818 uses a symbol replay buffer 820 to assist in finding the proper encoding which minimizes the peak power. The SSMLM 818 also may provide side information (if SLM is being used) to the Side Information Encoder Module (SIEM) 816 to perform error correction encoding, such as, for example, convolutional ECE. If blind SLM is being used, no side information may be encoded or transmitted. After error encoding, the side information may be passed back to the SSMLM 818, and then provided downstream for transmission to the base station receiver. The NACK Type 1 Decoder Logic Module (N1DLM) 822 may receive a NACK Type 1 notification from the local receiver, and will instruct the SSMLM 818 to transmit the same symbol using a different PAPR encoding.

The base station PAPR encoder 814 may also buffer all the user data in the scheduler 824 and then notifies the SSMLM 818 retransmit the same according to the slot or code of the user.

Figure 9:
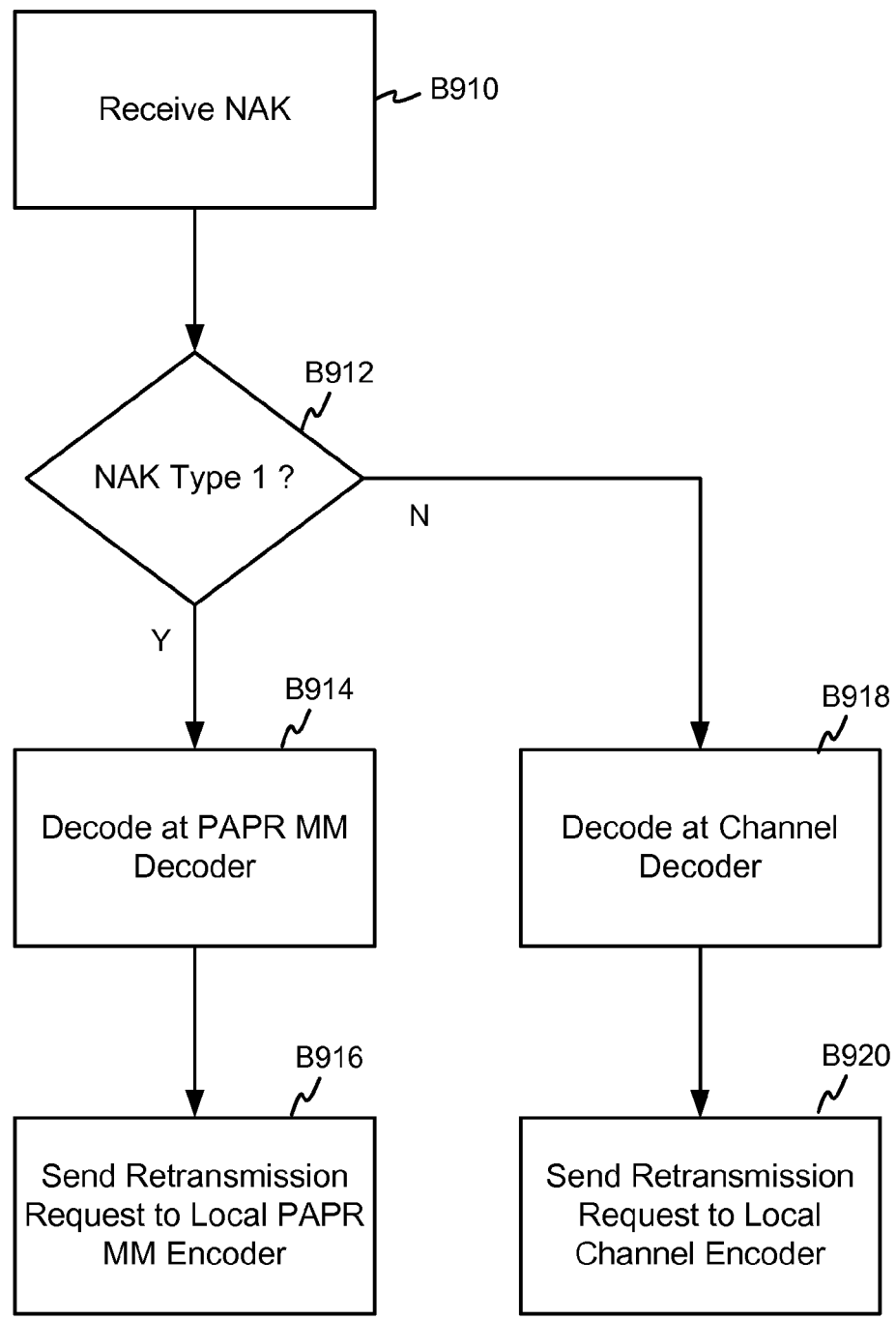
FIG. 9 depicts a flow chart of an exemplary process for Negative Acknowledgement (NACK) detection which may take place in an exemplary receiver.

FIG. 9 depicts a flow chart of an exemplary process for Negative Acknowledgement (NACK) detection which may take place in an exemplary receiver. The receiver may first receive a NACK B910. The receiver may first determine if the NACK is a NACK Type 1 B912. This may be performed by examining control bits within the NACK. If the control bits are consistent with a NACK Type 1, the receiver will decode the NACK Type 1 at the PAPR MM Decoder B914. The receiver may then send a retransmission request to the local PAPR MM encoder residing the local transmitter B916. If the control bits are consistent with a NACK Type 2, the receiver will decode the NACK Type 2 at the PAPR MM Decoder B914. The receiver may then send a retransmission request to the local PAPR MM encoder residing the local transmitter B916. The backend decoder may send a retransmission request to the local channel encoder B920.

Figure 10:
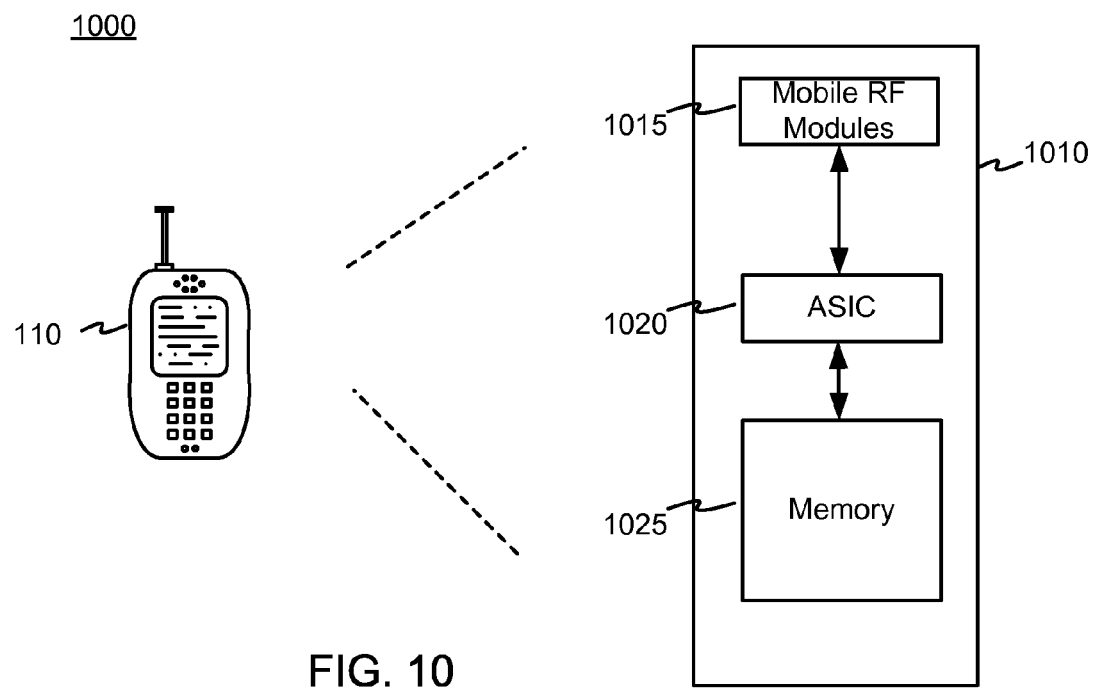
FIG. 10 shows a top-level block diagram showing various components of an exemplary mobile device.

FIG. 10 is a top-level block diagram showing various components of an exemplary mobile device 110. The mobile device 110 is shown in the form of a cellular telephone; however, embodiments of the invention can be realized on any form of mobile device 110 which may perform digital communications over network 100. For example, the mobile device 110 can be any device having wireless communication capabilities, including without limitation, wireless modems, PCMCIA cards, personal computers, telephones, or any combination or sub-combination thereof.

The mobile device 110 may have a platform 1010 that can exchange data and/or commands over the network 100. The platform 1010 can include one or more mobile RF modules 1015 operably coupled to an application specific integrated circuit ("ASIC") 1020, or other processor, microprocessor, logic circuit, or any other data processing device. The ASIC 1020 or other processor may execute an application programming interface ("API") layer that interfaces with any resident programs stored in the memory 1025 of the mobile device 110. The memory 1025 can be comprised of read-only and/or random-access memory (RAM and ROM), EEPROM, flash cards, or any memory common to such platforms.

Various communication protocol layers used by the wireless network 100 may also reside in the platform 1010 which may execute various commands and processes at different layers (not shown in FIG. 10). The communication protocol layers may include, for example, a Radio Resource Control (RRC) layer, a Radio Link Control (RLC) layer, a Medium Access Control (MAC) layer, and a Physical Layer (L1). Information received for the physical layer may be decoded and transferred between the various layers MAC, RLC, and RRC. Consistent with the HSDPA standard introduced in 3GPP Release 5, the higher layers may transfer traffic data packets using a High-Speed Downlink Shared Channel (HS-DSCH). The same applies for the other HSDPA channels which include the uplink High Speed Dedicated Physical Control Channel (HS-DPCCH), which carries ACK/NACK feedback information, and the downlink High-Speed Shared Control Channel (HS-SCCH), which carries control information associated with the HS-DSCH.

A portion of memory 1025 may be dedicated storing both data and/or instructions consistent with the methods presented herein. For example, the memory 1025 used for storing soft bits of HS-DSCH Transport Block Sizes, also referred as packets, associated with the HARQ processes. In accordance with the HS-DSCH physical layer (L1), the HARQ buffer may be divided into smaller buffers which may be used for incremental redundancy (IR) recombination processing, each dedicated to one process. On each process, these soft bits represent the H-ARQ data stored between the two stages of HS-DSCH physical layer rate matching, a version of which is carried during each transmission. The individual buffers aforementioned are hereinafter referred to as HARQ buffer memory locations. Each HARQ buffer memory location may have a number of soft bits or size for each HARQ process.

Figure 11:
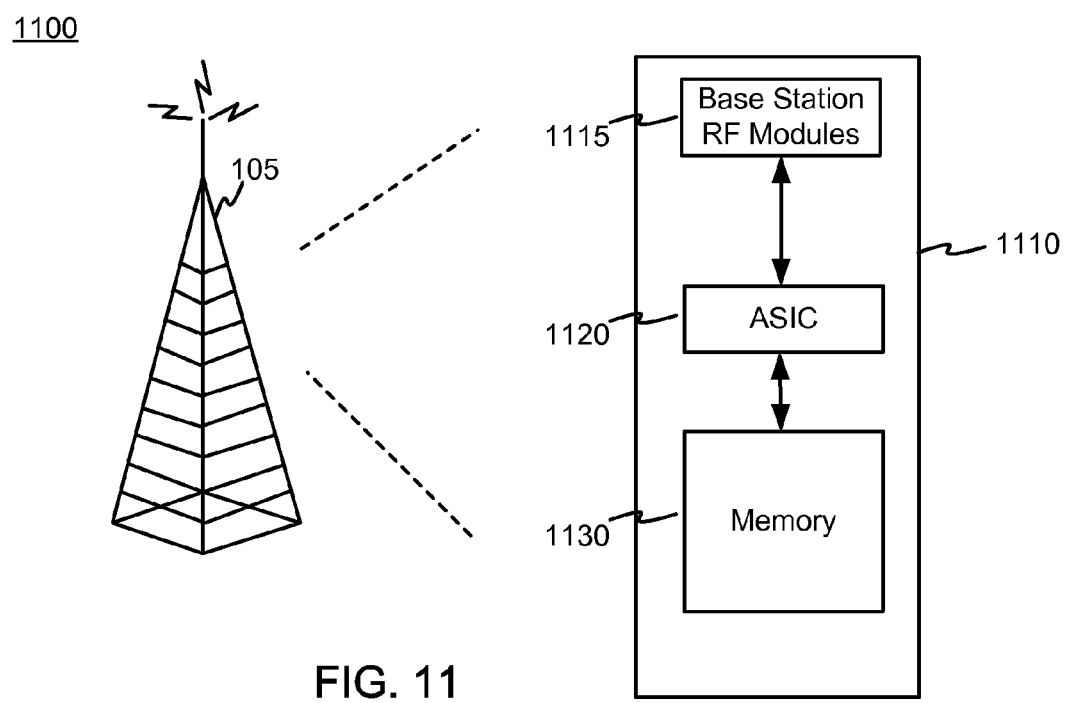
FIG. 11 shows a top-level block diagram showing various components of an exemplary base station.

FIG. 11 is a top-level block diagram showing various components of an exemplary base station 105. The base station 105 exchange data and/or commands over the network 100 with mobile devices 110. The base station 105 can include a platform 1110 which includes base station RF modules 1115 operably coupled to an application specific integrated circuit ("ASIC") 1120, or other processor, microprocessor, logic circuit, or any other data processing device. The ASIC 1120 or other processor may execute an application programming interface ("API") layer that interfaces with any resident programs stored in the memory 1125 of the mobile device 110. The memory 1125 can be comprised of read-only and/or random-access memory (RAM and ROM), EEPROM, flash cards, or any memory common to such platforms.

Various communication protocol layers used by the wireless network 100 may also reside in the platform 1110 which may execute various commands and processes at different layers (not shown in FIG. 11). The communication protocol layers may include, for example, a Radio Resource Control (RRC) layer, a Radio Link Control (RLC) layer, a Medium Access Control (MAC) layer, and a Physical Layer (L1). Information received for the physical layer may be decoded and transferred between the various layers MAC, RLC, and RRC.

A portion of memory 1125 may be dedicated storing both data and/or instructions consistent with the methods presented herein. For example, the information contained in all HARQ processes collectively is stored in a "virtual IR" buffer in memory 1130.

Accordingly, an embodiment of the invention can include the mobile device 300 including the ability to perform the functions described herein. The various logic elements can be embodied in discrete elements, software modules executed on a processor or any combination of software and hardware to achieve the functionality disclosed herein. For example, the ASIC 1020 and the memory 1025 may all be used cooperatively to load, store and execute the various functions disclosed herein and thus the logic to perform these functions may be distributed over various elements. Alternatively, the functionality could be incorporated into one discrete component (e.g., in embedded memory in the ASIC/processor 1020). Therefore, the features of the mobile device 110 in FIG. 10 are to be considered merely illustrative and the invention is not limited to the illustrated features or arrangement.

One will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, one will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Individuals may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a method for reducing HARQ retransmissions using power management techniques.

Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method for correcting errors received over a communication link, comprising:
   receiving a first retransmission of a packet at a back end of a receiver, wherein the first retransmission of the packet originates from a channel encoder;
   determining that the packet is corrupted if the packet has an error which is uncorrectable using one or more of the first retransmission or an initial transmission of the packet;
   performing a first level of error correction at a front end of the receiver based upon a second retransmission of the packet, wherein the second retransmission of the packet originates from a Peak-to-Average Power Ratio (PAPR) management module encoder;
   determining if the corrupted packet was corrected by the first level of error correction; and
   performing a second level of error correction at the back end of the receiver based upon a third retransmission of the packet if the corrupted packet was not corrected by the first level of error correction, wherein the third retransmission of the packet originates from the channel encoder.

2. The method according to claim 1, further comprising:
   receiving side information corresponding to the second retransmission of the packet originating from the PAPR management module encoder; and
   determining if the side information has an uncorrectable error.

3. The method according to claim 2, further comprising:
   performing the second level of error correction at the back end of the receiver based upon the second retransmission of the packet if the side information does not have an uncorrectable error; and
   determining an error correction metric if the side information does have an uncorrectable error.

4. The method according to claim 1, further comprising:
   receiving side information corresponding to the second retransmission of the packet originating from the PAPR management module encoder; and
   performing one or more of an error detection operation or an error correction operation on the received side information.

5. The method according to claim 3, further comprising:
   determining if the error correction metric exceeds a threshold, wherein if the error correction metric does not exceed the threshold, the method further comprises:
   incrementing a counter associated with the error correction metric; and
   performing the first level of error correction again at the front end of the receiver based upon a subsequent retransmission of the packet originating from the PAPR management module encoder.

6. The method according to claim 3, further comprising:
   determining if the error correction metric exceeds a threshold, wherein if the error correction metric exceeds the threshold, the method further comprises:
   initializing a counter associated with the error correction metric; and
   performing the second level of error correction again at the back end of the receiver based on a subsequent retransmission of the packet originating from the channel encoder.

7. A method of correcting errors transmitted over a communications link, comprising:
   transmitting a packet to a receiver from a channel encoder at a back end of a transmitter;
   buffering a symbol corresponding to the packet in a Peak-to-Average-Power Ratio Management Module (PAPR MM) encoder at a front end of the transmitter;
   receiving a notification regarding the status of the packet from the receiver; and
   selecting between a first encoding and a second encoding based upon the received notification, wherein the first encoding corresponds to a first level of error correction associated with the PAPR MM encoder at the front end of the transmitter, and wherein the second encoding corresponds to a second level of error correction associated with the channel encoder at the back end of the transmitter.

8. The method according to claim 7, further comprising:
   selecting the first encoding in response to determining that the notification indicated that the packet had an uncorrectable error and that the notification is associated with the first level of error correction;
   using the first encoding and the buffered symbol corresponding to the packet to re-encode the packet in the PAPR MM encoder at the front end of the transmitter; and
   transmitting the re-encoded packet to the receiver from the PAPR MM encoder at the front end of the transmitter.

9. The method according to claim 8, further comprising:
   using selective mapping to re-encode the packet in the PAPR MM encoder at the front end of the transmitter; and
   transmitting side information corresponding to the re-encoded packet in addition to the re-encoded packet to the receiver from the PAPR MM encoder at the front end of the transmitter.

10. The method according to claim 7, further comprising:
    selecting the second encoding in response to determining that the notification indicated that the packet had an uncorrectable error and that the notification is associated with the second level of error correction;
    using the second encoding to re-encode the packet in the channel encoder at the back end of the transmitter; and
    transmitting the re-encoded packet to the receiver from the channel encoder at the back end of the transmitter.

11. The method according to claim 7, further comprising:
    moving a retransmission window forward in response to determining that the notification indicated that the packet had no uncorrectable error; and
    transmitting a next packet to the receiver from the channel encoder at the back end of the transmitter.

12. A method for performing multi-level error correction which reduces HARQ retransmissions, comprising:
- receiving, at a first receiver, a packet retransmission from a second transmitter;
- determining, at the first receiver, if the packet has an error which is uncorrectable using one or more of the packet retransmission or an initial transmission;
- transmitting, from a first transmitter, a negative acknowledgement (NACK) associated with the packet retransmission to a second receiver; and
- selecting, at the second transmitter, between a first encoding and a second encoding based upon the NACK associated with the packet retransmission, wherein the first encoding corresponds to a first level of error correction associated with a NACK Type 1 transmitted from a front end of the first transmitter to a front end of the second receiver, and wherein the second encoding corresponds to a second level of error correction associated with a NACK Type 2 transmitted from a back end of the first transmitter to a back end of the second receiver.

13. The method according to claim 12, wherein if the NACK transmitted from the first transmitter corresponds to the NACK Type 1, the method further comprises:
- using the first encoding to re-encode the packet at a Peak-to-Average Power Ratio Management Module (PAPR MM) encoder residing in a front end of the second transmitter;
- transmitting, from the front end of the second transmitter, a subsequent packet retransmission to a front end of the first receiver, wherein the subsequent packet retransmission includes the re-encoded packet; and
- decoding the re-encoded packet included in the subsequent packet retransmission in a PAPR MM decoder residing in the front end of the first receiver.

14. The method according to claim 13, further comprising;
- generating side information corresponding to the re-encoded packet in the PAPR MM encoder residing in the front end of the second transmitter;
- transmitting the side information corresponding to the re-encoded packet with the subsequent packet transmission from the front end of the second transmitter to the front end of the first receiver; and
- using, at the PAPR MM decoder residing in the front end of the first receiver, the side information transmitted from the front end of the second transmitter to decode the re-encoded packet included in the subsequent packet retransmission.

15. The method according to claim 13, further comprising:
- deriving side information corresponding to the re-encoded packet at the PAPR MM decoder residing in the front end of the first receiver; and
- using, at the PAPR MM decoder, the derived side information to decode the re-encoded packet included in the subsequent packet retransmission.

16. The method according to claim 12, wherein if the NACK transmitted from the first transmitter corresponds to the NACK Type 2, the method further comprises:
- using the second encoding to re-encode the packet at a channel encoder residing in a back end of the second transmitter;
- transmitting, from the back end of the second transmitter, a subsequent packet retransmission to a back end of the first receiver, wherein the subsequent packet retransmission includes the re-encoded packet; and
- decoding the re-encoded packet included in the subsequent packet retransmission at a channel decoder residing in the back end of the first receiver.

17. A receiver for performing multi-level error correction to reduce HARQ retransmissions, comprising:
- a Peak-to-Average-Power Ratio Management Module (PAPR MM) decoder residing in a front end of the receiver, wherein the PAPR MM decoder is configured to perform a first level of error correction utilizing one or more first retransmissions that originate at a front end of a distal transmitter;
- a symbol demapping module connected to the PAPR MM decoder;
- a deinterleaver connected to the symbol demapping module; and
- a decoder residing in a back end of the receiver, wherein the decoder is connected to the deinterleaver and configured to perform a second level of error correction utilizing one or more second retransmissions that originate at a back end of the distal transmitter.

18. The receiver according to claim 17, wherein the one or more first retransmissions originate from a PAPR MM encoder residing in the front end of the distal transmitter.

19. The receiver according to claim 18, wherein the PAPR MM decoder is configured to manage peak power using selective mapping and perform one or more an error detection operation or an error correction operation on side information received from the PAPR MM encoder, wherein the received side information corresponds to the one or more first retransmissions that originate from the PAPR MM encoder.

20. The receiver according to claim 18, wherein the PAPR MM decoder is configured to manage peak power using blind selective mapping and derive side information corresponding to one or more data packets received in the one or more first retransmissions that originate from the PAPR MM encoder.

21. The receiver according to claim 20, wherein the PAPR MM decoder is configured to derive the side information corresponding to the one or more data packets received in the one or more first retransmissions using a maximum likelihood estimation and validate the derived side information using a statistical metric.

22. The receiver according to claim 17, wherein the one or more second retransmissions originate from a channel encoder residing in the back end of the distal transmitter.

23. The receiver according to claim 17, wherein the PAPR MM decoder resides in a mobile device and further comprises:
- a NACK Type 1 generation logic module;
- a side information decoder module connected to the NACK Type 1 generation logic module;
- a symbol detection module connected to the side information decoder module, wherein the symbol detection module is configured to receive decoded side information from the side information decoder module; and
- a symbol lookup module connected to the symbol detection module.

24. The receiver according to claim 23, wherein the NACK Type 1 generation logic module is configured to notify a local transmitter to send a NACK Type 1 to a base station associated with the distal transmitter in response to a number of packet errors associated with one or more of the first retransmissions or the second retransmissions exceeding a threshold.

25. The receiver according to claim 17, wherein the PAPR MM decoder resides in a base station and further comprises:
- a NACK Type 1 generation logic module;
- a side information decoder module connected to the NACK Type 1 generation logic module;
- a symbol detection module connected to the side information decoder module, wherein the symbol detection module is configured to receive decoded side information from the side information decoder module;
a symbol lookup module connected to the symbol detection module; and
a scheduler connected to the symbol detection module and the NACK Type 1 generation logic module.

26. The receiver according to claim 25, wherein the NACK Type 1 generation logic module is configured to notify a local transmitter to send one or more NACK Type 1 notifications to a mobile device associated with the distal transmitter in response to a number of packet errors associated with one or more of the first retransmissions or the second retransmissions exceeding a threshold.

27. The receiver according to claim 25, wherein the scheduler is configured to accommodate timing associated with the one or more NACK Type 1 notifications for multiple mobile devices.

28. The receiver according to claim 27, wherein the scheduler is configured to deactivate NACK Type 1 functionality for one or more of the multiple mobile devices that cannot accommodate the first level of error correction.

29. A transmitter for performing multi-level error correction to reduce HARQ retransmissions, comprising:
a Peak-to-Average-Power Ratio Management Module (PAPR MM) encoder residing in a front end of the transmitter, wherein the PAPR MM encoder is configured to send one or more first retransmissions to a front end of a distal receiver to accommodate a first level of error correction; and
at least one channel for modulating data for transmission to the distal receiver, wherein the at least one channel is connected to the PAPR MM encoder and further comprises:
a channel encoder residing in a back end of the transmitter, wherein the channel encoder is configured to send one or more second retransmissions to a back end of the distal receiver to accommodate a second level of error correction;
an interleaver connected to the channel encoder; and
a symbol mapping module connected to the interleaver connected to the PAPR MM encoder.

30. The transmitter according to claim 29, wherein the PAPR MM encoder is configured to send the one or more first retransmissions to accommodate the first level of error correction in response to one or more retransmission requests received from a front end of a distal transmitter.

31. The transmitter according to claim 30, wherein the PAPR MM encoder is configured to manage peak power using selective mapping and transmit side information corresponding to the one or more first retransmissions to the front end of the distal receiver.

32. The transmitter according to claim 30, wherein the PAPR MM encoder is configured to manage peak power using blind selective mapping and not transmit side information corresponding to the one or more first retransmissions to the front end of the distal receiver.

33. The transmitter according to claim 29, wherein the channel encoder is configured to send the one or more second retransmissions to accommodate the second level of error correction in response to one or more retransmission requests received from a back end of a distal transmitter.

34. The transmitter according to claim 29, wherein the PAPR MM encoder resides in a mobile device and further comprises:
a NACK Type 1 decoder logic module;
a side information encoder module connected to the NACK Type 1 decoder logic module;
a symbol selection and mapping logic module connected to the side information encoder module, wherein the symbol selection and mapping logic module is configured to receive encoded side information from the side information encoder module; and
a symbol replay buffer connected to the symbol selection and mapping logic module.

35. The transmitter according to claim 34, wherein the NACK Type 1 decoder logic module is configured to decode one or more NACK Type 1 notifications sent from a NACK Type 1 generation logic module residing in the mobile device.

36. The transmitter according to claim 29, wherein the PAPR MM encoder resides in a base station and further comprises:
a NACK Type 1 decoder logic module;
a side information encoder module connected to the NACK Type 1 decoder logic module;
a symbol selection and mapping logic module connected to the side information encoder module, wherein the symbol selection and mapping logic module is configured to receive encoded side information from the side information encoder module;
a symbol replay buffer connected to the symbol selection and mapping logic module; and
a scheduler connected to the symbol selection and mapping logic module and the symbol replay buffer.

37. The transmitter according to claim 36, wherein the NACK Type 1 decoder logic module is configured to receive one or more NACK Type 1 retransmission requests from a local receiver in response to a number of packet errors associated with one or more of the first retransmissions or the second retransmissions exceeding a threshold.

38. The transmitter according to claim 36, wherein the scheduler is configured to accommodate timing associated with the one or more NACK Type 1 retransmission requests for multiple mobile devices.

39. The transmitter according to claim 38, wherein the scheduler is configured to buffer all data associated with a user and notify the symbol selection and mapping logic module to retransmit a packet according to one or more of a slot or a code associated with the user.

40. A method for coordinating a multi-level error correction for reducing HARQ retransmissions, comprising:
providing, from a back end of a receiver, a NACK Type 2 notification to a back end of a local transmitter in response to receiving an initial packet having an uncorrectable error;
receiving, at the back end of the receiver, a first retransmitted packet having a new channel encoding in response to the NACK Type 2 notification;
providing, from a front end of the receiver, a NACK Type 1 notification to a front end of the local transmitter in response to the first retransmitted packet having an uncorrectable error; and
receiving, at the front end of the receiver, a second retransmitted packet having a new Peak-to-Average Power Ratio (PAPR) encoding, wherein the second retransmitted packet originates from a front end of a distal transmitter.

41. The method according to claim 40, further comprising:
receiving, at the back end of the receiver, the initial packet transmission having the uncorrectable error from a back end of the distal transmitter; and
providing, from the back end of the receiver, the NACK Type 2 notification to the front end of the receiver.

42. The method according to claim 40, further comprising:
  determining, at the front end of the receiver, that side information corresponding to the second retransmitted packet is not valid;
  determining, at the front end of the receiver, that an error correction metric has not exceeded a threshold;
  providing, from the front end of the receiver, a subsequent NACK Type 1 notification to the front end of the local transmitter; and
  receiving a third retransmitted packet at the front end of the receiver, wherein the third retransmitted packet has a new PAPR encoding and originates from the front end of the distal transmitter.

43. The method according to claim 40, further comprising:
  determining, at the front end of the receiver, that side information corresponding to the second retransmitted packet is not valid;
  determining, at the front end of the receiver, that an error correction metric has exceeded a threshold;
  providing, from the front end of the receiver, a counter expired notification to the back end of the receiver;
  providing, from the back end of the receiver, a subsequent NACK Type 2 notification to the back end of the local transmitter; and
  receiving a third retransmitted packet at the back end of the receiver, wherein the third retransmitted packet has a new channel encoding and originates from the back end of the distal transmitter.

44. A method for coordinating a multi-level error correction for reducing HARQ retransmissions, comprising:
  providing, from a back end of a transmitter, an initial packet transmission having an uncorrectable error to a back end of a distal receiver;
  receiving, from a back end of a local receiver, a first retransmission request at the back end of the transmitter;
  retransmitting, from the back end of the transmitter, a first packet retransmission having a new channel encoding to the back end of the distal receiver;
  receiving, from a front end of the local receiver, a second retransmission request at a front end of the transmitter; and
  retransmitting, from the front end of the transmitter, a second packet retransmission having a new Peak-to-Average Power Ratio (PAPR) encoding to a front end of the distal receiver.

45. The method according to claim 44, further comprising:
  receiving, from the front end of the local receiver, a third retransmission request at the front end of the transmitter; and
  retransmitting, from the front end of the transmitter, a third packet retransmission having a new PAPR encoding to a front end of the distal receiver.

46. The method according to claim 44, further comprising:
  receiving, from the back end of the local receiver, a third retransmission request at the back end of the transmitter; and
  retransmitting, from the back end of the transmitter, a third packet retransmission having a new channel encoding.

47. An apparatus for correcting errors received over a communication link, comprising:
  means for receiving a first retransmission of a packet at a back end of a receiver, wherein the first retransmission of the packet originates from a channel encoder;
  means for determining that the packet is corrupted if the packet has an error which is uncorrectable using one or more of the first retransmission or an initial transmission of the packet;
  means for performing a first level of error correction at a front end of the receiver based upon a second retransmission of the packet, wherein the second retransmission of the packet originates from a Peak-to-Average Power Ratio (PAPR) management module encoder;
  means for determining if the corrupted packet was corrected by the first level of error correction; and
  means for performing a second level of error correction at the back end of the receiver based upon a third retransmission of the packet if the corrupted packet was not corrected by the first level of error correction, wherein the third retransmission of the packet originates from the channel encoder.

48. The apparatus according to claim 47, further comprising:
  means for receiving side information corresponding to the second retransmission of the packet originating from the PAPR management module encoder; and
  means for determining if the side information has an uncorrectable error.

49. The apparatus according to claim 48, further comprising:
  means for performing the second level of error correction at the back end of the receiver based upon the second retransmission of the packet if the side information does not have an uncorrectable error; and
  means for determining an error correction metric if the side information does have an uncorrectable error.

50. The apparatus according to claim 47, further comprising
  means for receiving side information corresponding to the second retransmission of the packet originating from the PAPR management module encoder; and
  means for performing one or more of an error detection operation or an error correction operation on the received side information.

51. The apparatus according to claim 50, wherein the first level of error correction utilizes selective mapping and one or more of the error detection operation or the error correction operation comprises convolutional error correction coding.

52. An apparatus of correcting errors transmitted over a communications link, comprising:
  means for transmitting a packet to a receiver from a channel encoder at a back end of a transmitter;
  means for buffering a symbol corresponding to the packet in a Peak-to-Average-Power Ratio Management Module (PAPR MM) encoder at a front end of the transmitter;
  means for receiving a notification regarding the status of the packet from the receiver; and
  means for selecting between a first encoding and a second encoding based upon the received notification, wherein the first encoding corresponds to a first level of error correction associated with the PAPR MM encoder at the front end of the transmitter, and the second encoding corresponds to a second level of error correction associated with the channel encoder at the back end of the transmitter.

53. The apparatus according to claim 52, further comprising:
  means for selecting the first encoding in response to determining that the notification indicated that the packet had an uncorrectable error and that the notification is associated with the first level of error correction;
  means for using the first encoding and the buffered symbol corresponding to the packet to re-encode the packet in the PAPR MM encoder at the front end of the transmitter; and means for transmitting, from the PAPR MM encoder at the front end of the transmitter, the re-encoded packet to the receiver.

54. The apparatus according to claim 52, further comprising:
means for selecting the second encoding in response to determining that the notification indicated that the packet had an uncorrectable error and that the notification is associated with the second level of error correction;
means for using the second encoding to re-encode the packet in the channel encoder at the back end of the transmitter; and
means for transmitting, from the channel encoder at the back end of the transmitter, the re-encoded packet to the receiver.

55. An apparatus for performing multi-level error correction which reduces HARQ retransmissions, comprising:
means for receiving, at a first receiver, a packet retransmission from a second transmitter;
means for determining, at the first receiver, if the packet has an error which is uncorrectable using one or more of the packet retransmission or an initial transmission;
means for transmitting, from a first transmitter, a negative acknowledgement (NACK) associated with the packet retransmission to a second receiver; and
means for selecting, at the second transmitter, between a first encoding and a second encoding based upon the NACK associated with the packet retransmission, wherein the first encoding corresponds to a first level of error correction associated with a NACK Type 1 transmitted from a front end of the first transmitter to a front end of the second receiver, and wherein the second encoding corresponds to a second level of error correction associated with a NACK Type 2 transmitted from a back end of the first transmitter to a back end of the second receiver.

56. The apparatus according to claim 55, wherein if the NACK transmitted from the first transmitter corresponds to the NACK Type 1, further comprising:
means for using the first encoding to re-encode the packet at a Peak-to-Average Power Ratio Management Module (PAPR MM) encoder residing in a front end of the second transmitter;
means for transmitting, from the front end of the second transmitter, a subsequent packet retransmission to a front end of the first receiver, wherein the subsequent packet retransmission includes the re-encoded packet; and
means for decoding the re-encoded packet included in the subsequent packet retransmission in a PAPR MM decoder residing in the front end of the first receiver.

57. The apparatus according to claim 56, further comprising:
means for generating side information corresponding to the re-encoded packet in the PAPR MM encoder residing in the front end of the second transmitter;
means for transmitting the side information corresponding to the re-encoded packet with the subsequent packet transmission from the front end of the second transmitter to the front end of the first receiver; and
means for using, at the PAPR MM decoder residing in the front end of the first receiver, the side information transmitted from the front end of the second transmitter to decode the re-encoded packet included in the subsequent packet retransmission.

58. The apparatus according to claim 55, wherein if the NACK transmitted from the first transmitter corresponds to the NACK Type 2, further comprising:
means for using the second encoding to re-encode the packet at a channel encoder residing in a back end of the second transmitter;
means for transmitting, from the back end of the second transmitter, a subsequent packet retransmission to a back end of the first receiver, wherein the subsequent packet retransmission includes the re-encoded packet; and
means for decoding the re-encoded packet included in the subsequent packet retransmission at a channel decoder residing in the back end of the first receiver.

59. An apparatus for coordinating a multi-level error correction for reducing HARQ retransmissions, comprising:
means for providing, from a back end of a receiver, a NACK Type 2 notification to a back end of a local transmitter in response to receiving an initial packet having an uncorrectable error;
means for receiving, at the back end of the receiver, a first retransmitted packet having a new channel encoding in response to the NACK Type 2 notification;
means for providing, from a front end of the receiver, a NACK Type 1 notification to a front end of the local transmitter in response to the first retransmitted packet having an uncorrectable error; and
means for receiving, at the front end of the receiver, a second retransmitted packet having a new Peak-to-Average Power Ratio (PAPR encoding, wherein the second retransmitted packet originates from a front end of a distal transmitter.

60. The apparatus according to claim 59, further comprising:
means for receiving, at the back end of the receiver, the initial packet transmission having the uncorrectable error from a back end of the distal transmitter; and
means for providing, from the back end of the receiver, the NACK Type 2 notification to the front end of the receiver.

61. The apparatus according to claim 59, further comprising:
means for providing, from the back end of the receiver, the NACK Type 1 notification to the front end of the receiver.

62. The apparatus according to claim 59, further comprising:
means for determining, at the front end of the receiver, that side information corresponding to the second retransmitted packet is valid; and
means for providing, from the front end of the receiver, an ACK notification to the back end of the local transmitter.

63. The apparatus according to claim 59, further comprising:
means for determining, at the front end of the receiver, that side information corresponding to the second retransmitted packet is not valid;
means for determining, at the front end of the receiver, that an error correction metric has not exceeded a threshold;
means for providing, from the front end of the receiver, a subsequent NACK Type 1 notification to the front end of the local transmitter; and
means for receiving a third retransmitted packet at the front end of the receiver, wherein the third retransmitted packet has a new PAPR encoding and originates from the front end of the distal transmitter.

64. The apparatus according to claim 59, further comprising:
- means for determining, at the front end of the receiver, that side information corresponding to the second retransmitted packet is not valid;
- means for determining, at the front end of the receiver, that an error correction metric has exceeded a threshold;
- means for providing, from the front end of the receiver, a counter expired notification to the back end of the receiver;
- means for providing, from the back end of the receiver, a subsequent NACK Type 2 notification to the back end of the local transmitter; and
- means for receiving a third retransmitted packet at the back end of the receiver, wherein the third retransmitted packet has a new channel encoding and originates from the back end of the distal transmitter.

65. An apparatus for coordinating a multi-level error correction for reducing HARQ retransmissions, comprising:
- means for providing, from a back end of a transmitter, an initial packet transmission having an uncorrectable error to a back end of a distal receiver;
- means for receiving, from a back end of a local receiver, a first retransmission request at the back end of the transmitter;
- means for retransmitting, from the back end of the transmitter, a first packet retransmission having a new channel encoding to the back end of the distal receiver;
- means for receiving, from a front end of the local receiver, a second retransmission request at a front end of the transmitter; and
- means for retransmitting, from the front end of the transmitter, a second packet retransmission having a new Peak-to-Average Power Ratio (PAPR) encoding to a front end of the distal receiver.

66. The apparatus according to claim 65, further comprising:
- means for receiving, from the front end of the local receiver, a third retransmission request at the front end of the transmitter; and
- means for retransmitting, from the front end of the transmitter, a third packet retransmission having a new PAPR encoding to a front end of the distal receiver.

67. The apparatus according to claim 65, further comprising:
- means for receiving, from the back end of the local receiver, a third retransmission request at the back end of the transmitter; and
- means for retransmitting, from the back end of the transmitter, a third packet retransmission having a new channel encoding.

68. A computer readable media embodying logic for correcting errors received over a communication link, the logic configured to perform a method which comprises:
- receiving a first retransmission of a packet at a back end of a receiver, wherein the first retransmission of the packet originates from a channel encoder;
- determining that the packet is corrupted if the packet has an error which is uncorrectable using one or more of the first retransmission or an initial transmission of the packet;
- performing a first level of error correction at a front end of the receiver based upon a second retransmission of the packet, wherein the second retransmission of the packet originates from a Peak-to-Average Power Ratio (PAPR) management module encoder;
- determining if the corrupted packet was corrected by the first level of error correction; and
- performing a second level of error correction at the back end of the receiver based upon a third retransmission of the packet if the corrupted packet was not corrected by the first level of error correction, wherein the third retransmission of the packet originates from the channel encoder.

69. The computer readable media according to claim 68, having additional logic configured to perform the method which further comprises:
- receiving side information corresponding to the second retransmission of the packet originating from the PAPR management module encoder; and
- determining if the side information has an uncorrectable error.

70. The computer readable media according to claim 69, having additional logic configured to perform the method which further comprises:
- performing the second level of error correction at the back end of the receiver based upon the second retransmission of the packet if the side information does not have an uncorrectable error; and
- determining an error correction metric if the side information does have an uncorrectable error.

71. The computer readable media according to claim 70, having additional logic configured to perform the method which further comprises:
- determining if the error correction metric exceeds a threshold, wherein if the error correction metric does not exceed the threshold, the method further comprises:
  - incrementing a counter associated with the error correction metric; and
  - performing the first level of error correction again at the front end of the receiver based upon a subsequent retransmission of the packet originating from the PAPR management module encoder.

72. A computer readable media embodying logic for correcting errors transmitted over a communication link, the logic configured to perform a method which comprises:
- transmitting a packet to a receiver from a channel encoder at a back end of a transmitter;
- buffering a symbol corresponding to the packet in a Peak-to-Average-Power Ratio Management Module (PAPR MM) encoder at a front end of the transmitter;
- receiving a notification regarding the status of the packet from the receiver; and
- selecting between a first encoding and a second encoding based upon the received notification, wherein the first encoding corresponds to a first level of error correction associated with the PAPR MM encoder at the front end of the transmitter, and wherein the second encoding corresponds to a second level of error correction associated with the channel encoder at the back end of the transmitter.

73. The computer readable media according to claim 72, having additional logic configured to perform the method which further comprises:
- selecting the first encoding in response to determining that the notification indicated that the packet had an uncorrectable error and that the notification is associated with the first level of error correction;
- using the first encoding, the buffered symbol, and selective mapping to re-encode the packet in the PAPR MM encoder at the front end of the transmitter;

transmitting, from the PAPR MM encoder at the front end of the transmitter, the re-encoded packet and side information corresponding to the re-encoded packet to the receiver.

74. The computer readable media according to claim 72, having additional logic configured to perform the method which further comprises:
   selecting the second encoding in response to determining that the notification indicated that the packet had an uncorrectable error and that the notification is associated with the second level of error correction;
   using the second encoding to re-encode the packet in the channel encoder at the back end of the transmitter; and
   transmitting the re-encoded packet to the receiver from the channel encoder at the back end of the transmitter.

75. The computer readable media according to claim 72, having additional logic configured to perform the method which further comprises:
   moving a retransmission window forward in response to determining that the notification indicated that the packet had no uncorrectable error; and
   transmitting a next packet to the receiver from the channel encoder at the back end of the transmitter.

* * * * *